(12) United States Patent
Molder et al.

(10) Patent No.: US 12,408,581 B2
(45) Date of Patent: Sep. 9, 2025

(54) BULK TRANSFER DELIVERY SYSTEM FOR MULTIPLE AGRICULTURAL PRODUCTS

(71) Applicant: CLEAN SEED AGRICULTURAL TECHNOLOGIES LTD., Burnaby (CA)

(72) Inventors: Daniel Kirk Stanley Molder, Regina (CA); Robert Sydney Ruff, Burnaby (CA); Gordon Blair Wilson, Burnaby (CA); Charles Joseph Schembri, Burnaby (CA); Edward Quon, Burnaby (CA); Colin Michael Rush, Burnaby (CA); Jason William Schultz, Bashaw (CA); Manmohanjit Singh Jheetey, Burnaby (CA)

(73) Assignee: CLEAN SEED AGRICULTURAL TECHNOLOGIES LTD.

( * ) Notice: Subject to any disclaimer, the term of this patent is extended or adjusted under 35 U.S.C. 154(b) by 287 days.

(21) Appl. No.: 18/245,504

(22) PCT Filed: Sep. 16, 2021

(86) PCT No.: PCT/CA2021/000085
§ 371 (c)(1),
(2) Date: Mar. 15, 2023

(87) PCT Pub. No.: WO2022/056616
PCT Pub. Date: Mar. 24, 2022

(65) Prior Publication Data
US 2024/0023478 A1 Jan. 25, 2024

Related U.S. Application Data

(60) Provisional application No. 63/079,233, filed on Sep. 16, 2020.

(30) Foreign Application Priority Data

Sep. 16, 2020 (CA) ...................................... 3093241

(51) Int. Cl.
*A01C 7/08* (2006.01)
*A01C 15/00* (2006.01)

(52) U.S. Cl.
CPC ............ *A01C 15/003* (2013.01); *A01C 7/082* (2013.01); *A01C 15/006* (2013.01)

(58) Field of Classification Search
CPC ....... A01C 7/081; A01C 7/082; A01C 15/006; A01C 15/003
See application file for complete search history.

(56) References Cited

U.S. PATENT DOCUMENTS

| 6,047,652 | A | 4/2000 | Prairie et al. |
| 9,596,803 | B2 * | 3/2017 | Wendte ................ A01B 79/005 |

(Continued)

FOREIGN PATENT DOCUMENTS

| CA | 2353199 A1 | 1/2002 |
| CA | 2899941 A1 | 4/2016 |

(Continued)

OTHER PUBLICATIONS

ISA/CA—Canadian Intellectual Property Office—International Search Report and Written Opinion of the International Searching Authority, mailed on Nov. 30, 2021 in relation to the corresponding international application No. PCT/CA2021/000085 filed Sep. 16, 2021.

*Primary Examiner* — Kaitlin S Joerger
(74) *Attorney, Agent, or Firm* — Field LLP; Michael Sharp

(57) ABSTRACT

An improved bulk transfer system for an agricultural seeder or planter breaks up the central fill system into two stages for supplying a plurality of agricultural products simultaneously to an array of metering pods, each pod containing a plurality of metering assemblies. Firstly, there is a continuous transfer of agricultural product from a trailing product cart to intermediate mini tanks mounted on a central frame and located adjacent the seeding drills and plurality of metering assemblies. The pressurized mini tanks receive agricultural products on demand. Secondly, agricultural products are transferred on demand from the mini tanks to each of the corresponding metering assemblies along the seeding drill. This arrangement enables redistribution of the weight of the (Continued)

bulk of the product farther away from the seeding drills, allowing for greater tow-behind product volumes.

30 Claims, 16 Drawing Sheets

(56) References Cited

U.S. PATENT DOCUMENTS

| | | | | |
|---|---|---|---|---|
| 9,949,427 | B2* | 4/2018 | Schweitzer | A01C 7/102 |
| 2016/0095274 | A1* | 4/2016 | Wendte | A01B 79/005 |
| | | | | 111/200 |
| 2016/0113191 | A1* | 4/2016 | Rosengren | A01C 7/102 |
| | | | | 701/50 |
| 2016/0120100 | A1* | 5/2016 | Thompson | A01C 15/006 |
| | | | | 406/120 |
| 2017/0086356 | A1* | 3/2017 | Schweitzer | A01C 5/068 |
| 2017/0305687 | A1* | 10/2017 | Roberge | B65G 53/10 |
| 2020/0107489 | A1* | 4/2020 | Hiedeman | A01C 15/003 |
| 2020/0245544 | A1* | 8/2020 | Erker | B01F 27/72 |

FOREIGN PATENT DOCUMENTS

| | | | |
|---|---|---|---|
| CA | 2940717 | A1 | 3/2017 |
| WO | 2017173532 | A1 | 10/2017 |

* cited by examiner

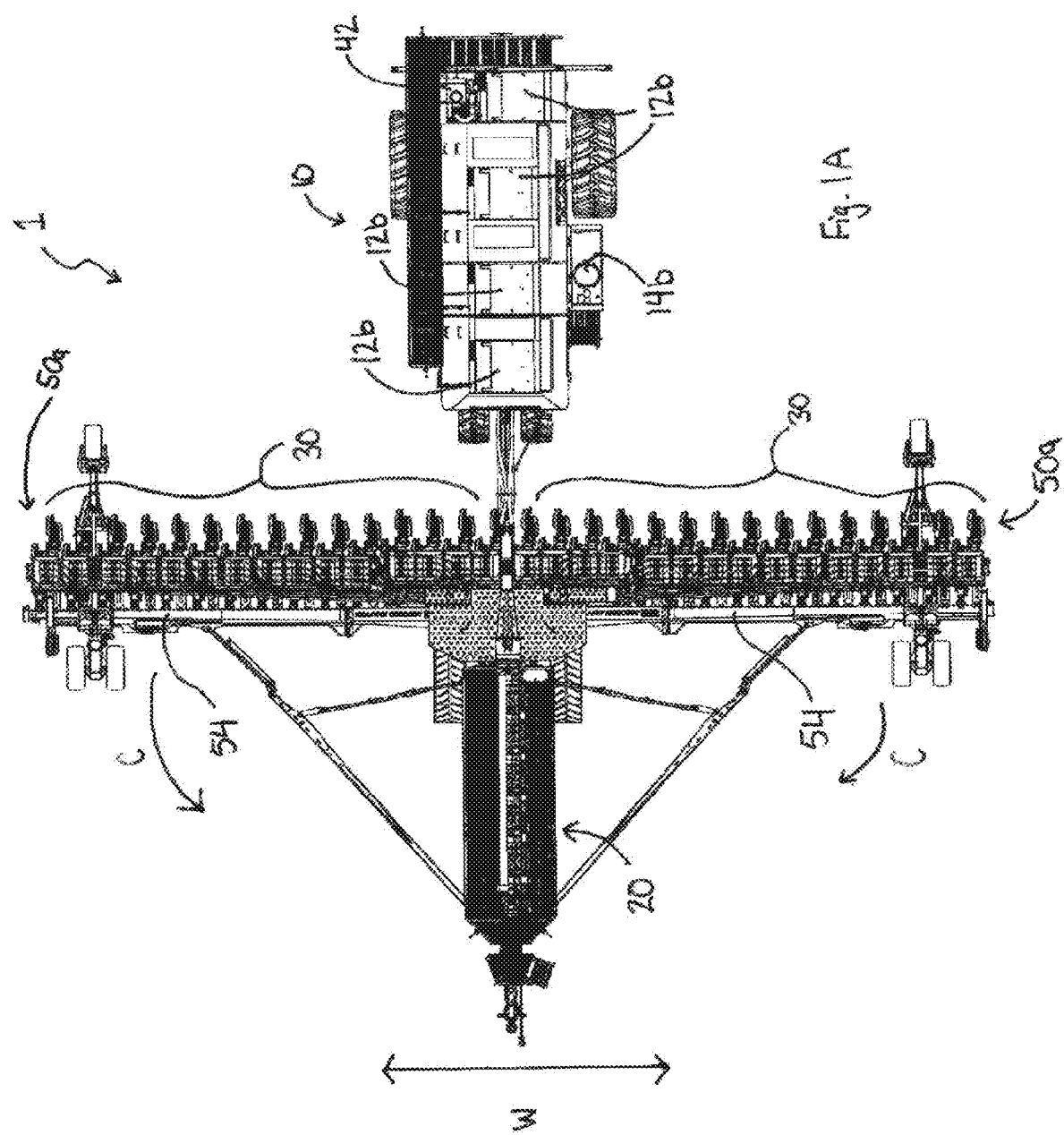

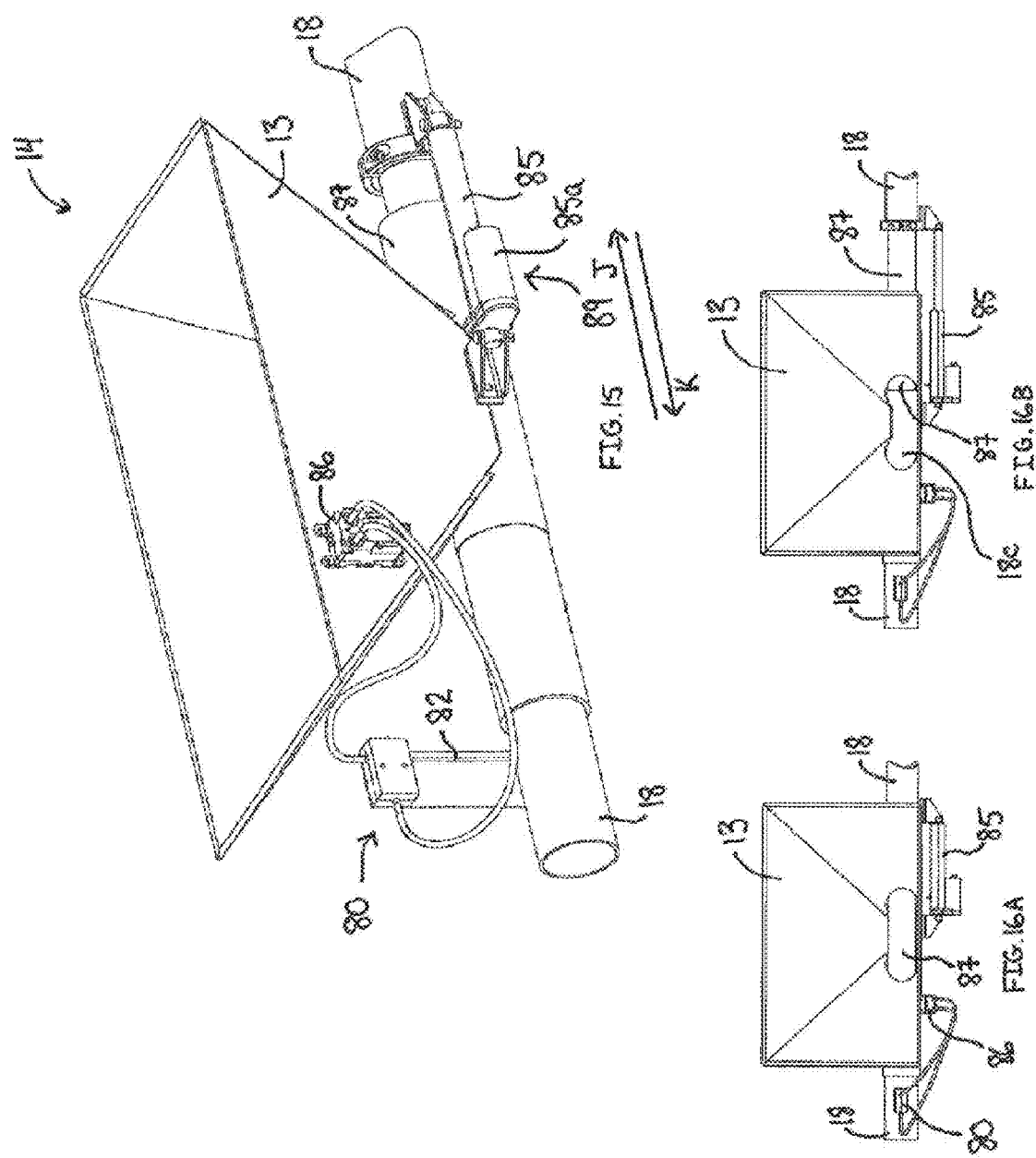

BULK TRANSFER DELIVERY SYSTEM FOR MULTIPLE AGRICULTURAL PRODUCTS

CROSS-REFERENCE TO RELATED APPLICATIONS

This application claims the benefit of U.S. Provisional patent application No. 63/079,233 and Canadian patent application no. 3,093,241, both of which were filed on Sep. 16, 2020 and are entitled "Bulk Transfer Delivery System for Multiple Granular Agricultural Product", and both of which are incorporated herein by reference.

FIELD

The present disclosure relates to agricultural seeding and planting equipment; in particular, the present disclosure relates to a bulk transfer delivery system for transferring multiple agricultural products from a bulk tank to a plurality of metering assemblies on demand.

BACKGROUND

Agriculture implements for applying agricultural products to many rows simultaneously are known in the art. An example of a seed planter distribution system for transporting seeds from a source into a plurality of seed metering bins is described in U.S. Pat. No. 6,047,652 to Prairie et al (the "652 patent"). The '652 patent describes a seed planter distribution system as including a manifold duct and a plurality of seed flow diverting structures that extend from the manifold into each metering bin, whereby each metering bin is filled in accordance with the flow of air available. An air source blows air through the screened bottom of a source seed tank to transport seed in an air stream through an outlet tube and into a duct, the duct leading to a chain of diverters and openings into a plurality of seed metering bins. When sufficient seed has entered into the bin, the outlet opening will be blocked and continue to fill with seed until the seed reaches the diverter. In the applicant's experience, such distribution systems suffer from, in particular, smaller grains or seeds clogging the ducts and forming blockages, which blockages may prevent seed from travelling to each of the bins. Such blockages often need to be removed before the seeding or planting operation can continue, causing delays.

Furthermore, portions of the field may not have been provided with product for a period of time before the blockage was discovered. A further issue with such systems may include that the distribution of seed across a row of seed metering bins is uneven, because the pressure supplied to the conduits and flow diverting structures to move the seed from a bulk tank to each of the metering bins may not be maintained throughout the system, resulting in higher volumes of seed being delivered to the bins closest to the source, and lower volumes of seed being delivered to the bins distal from the source.

Other prior art includes the applicant's own patent application PCT/CA2017/050407 (the "'407 application"), which application describes an air manifold, the air manifold including a plurality of bulk product hoppers of a bulk supply cart, in fluid communication with a product flow cavity and nozzle plenum positioned beneath each product hopper and in fluid communication with the hopper through a screen. Each product hopper is also provided with a Venturi plenum in fluid communication with a plurality of pick up nozzles through a Venturi coupling. The product flow cavity and nozzle plenum are provided with air from a first air source, and the Venturi plenum and coupling are provided with air from a second air source. The first air source entrains the agricultural product in an airstream, causing the product to flow through the pick-up nozzles, while the air flowing through the Venturi plenum and coupling is added to the air from the first air source flowing through the nozzles to thereby accelerate the entrained product through conduits to each metering assembly, thereby supplying each of the metering assemblies directly from the bulk product hoppers with agricultural product on demand. Screened vents on the supply branches, which feed a pair of metering assemblies with product flowing through the conduits, become temporarily blocked as the agricultural product fills the supply branch, thereby temporarily halting the flow of product to the supply branch until sufficient product flows out of the pair of metering assemblies so as to unblock the screened vents.

The system described in the '407 application includes large, pressurized product tanks mounted onto each of the hoppers, the product tanks mounted to a frame that is adjacent the seed drill arms. Because the conduits or hoses carry product directly from the large product tanks to each metering assembly along a row of metering assemblies, and because the efficiency of the transfer system can drop off as the length of the hoses or conduits increase, it is necessary to position the tanks as close as possible to the seed drill incorporating the plurality of metering assemblies. However, the applicant has found that the heavy weight of the large product tanks and the distribution system on the cart, combined with the product contained within the tanks when full, which product alone can weigh for example up to 50,000 pounds, requires a heavy, wide frame and tracks to support and move the cart along the field. Furthermore, once the large product tanks are empty, a transfer system is used whereby a nurse trailer filled with product is positioned on the field where it is expected a refill will occur, and the transfer of product from the nurse trailer to the large product tanks may take, for example, up to 35 minutes.

SUMMARY

In one aspect of the present disclosure, an improved bulk transfer system breaks up the central fill systems known in the prior art into two stages. Firstly, a continuous transfer from a trailing product tank into an intermediate central fill system, located adjacent the seeding drills and plurality of metering assemblies is provided, whereby the central fill system incorporates miniature, pressurized tanks (hereinafter, "mini tanks") for receiving the agricultural products. Secondly, the transfer system transfers the products from the mini tanks to each of the metering assemblies along the seeding drill. This arrangement allows for shorter conduit runs from the pressurized mini tanks to the meters and enables redistribution of the weight of the bulk of the product farther away from the seeding drills, allowing for greater tow-behind product volumes. In some embodiments, because each large product tank on the trailing product cart has a corresponding mini tank on the seeder frame, only a small number of conduits are required to run from the tow-behind product cart to the seeder frame; for example, the number of conduits running from the product cart to the central seeder frame may be equal to the number of product tanks on the product cart.

In one aspect of the present disclosure, a product transfer system for providing a continuous supply of a plurality of agricultural products from a plurality of product tanks to an array of metering assemblies includes a bulk transfer cart having a plurality of product tanks, each product tank adapted to carry one of the agricultural products. Each product tank feeds into a corresponding product conduit that is selectively pressurized with a cart air source, which may be a fan or blower. Each product conduit is fluidly connected to a corresponding mini tank mounted on a central frame of the central fill system, with the central frame coupled to an array of metering assemblies. The mini tanks include level sensors for detecting the presence and amount of agricultural product within the mini tank, the sensors in communication with an electronic controller. The mini tanks also include a plurality of pickup nozzles, each pickup nozzle incorporating a Venturi assembly. Each pick up nozzle is coupled to a metering conduit for conveying the agricultural product from the mini tank to at least one metering assembly of the array of metering assemblies configured for dispensing the agricultural product into the ground.

Each mini tank is in fluid communication with a first air source via a first air source manifold, wherein a first air stream generated by the first air source is directed through a plurality of vents in the mini tank so as to entrain the agricultural product in the first air stream and thereby carry the entrained agricultural product through the plurality of pickup nozzles. When the level sensor of the mini tank detects the mini tank is nearly full, the cart air source is shut off from the mini tank's corresponding product conduit to temporarily halt the conveying of agricultural product from the product tank to the product conduit and thence to the corresponding mini tank. When the level sensor detects the mini tank is nearly empty, the cart air source is supplied to the mini tank's corresponding product conduit to resume conveying the agricultural product from the product tank to the corresponding mini tank. The product transfer system is therefore configured to continuously supply agricultural product from each mini tank to each metering assembly of the array of metering assemblies via the plurality of pickup nozzles and corresponding plurality of metering conduits.

Preferably, in an embodiment of the present disclosure, the product transfer system includes a second air source and a second air manifold in fluid communication with a Venturi point of constriction of each pickup nozzle of the mini tank, wherein the second air source generates a second air stream directed through the second air manifold and the Venturi point of constriction of each pickup nozzle so as to create a pressure difference between the manifold conduits and the mini tank, and to accelerate the entrained agricultural product through the plurality of pickup nozzles and the corresponding metering conduits.

The level sensor of the mini tank, in some embodiments, may include an upper proximity sensor and a lower proximity sensor, with the lower proximity sensor is positioned at a lower elevation relative to the elevation of the upper sensor. When the upper sensor detects the agricultural product, a shut off control signal is delivered to an electronic controller of the system to close a valve of the mini tank's corresponding product conduit so as to shut off the corresponding product conduit from the cart air supply and thereby temporarily halt the transfer of product from the mini tank's corresponding product tank, enabling the buildup of product in the mini tank to clear out and thereby avoiding overfilling the mini tank. On the other hand, when the lower sensor detects an absence of the agricultural product, an open control signal is delivered to the electronic controller of the system to open the valve so as to enable air from the cart air supply to flow into the corresponding product conduit, thereby reinitiating transfer of product to the mini tank from the corresponding product tank, thereby supplying the mini tank with product to ensure continuous supply of that product to the array of metering assemblies.

The product transfer system may also include, in some embodiments, an airlock sandwiched between a bottom of each product tank of the plurality of product tanks and a pressurized cart hopper. The pressurized cart hopper includes a hopper level sensor in communication with the electronic controller. The electronic controller temporarily deactivates the airlock so as to halt the transfer of the agricultural product from the product tank to the cart hopper when the hopper level sensor detects that the cart hopper is nearly full, so as to allow a buildup of agricultural product in the cart hopper and corresponding product conduit to be removed through the product conduit to the corresponding mini tank before the airlock is re-activated to resume transfer of agricultural product from the product tank to the cart hopper. In some embodiments, there is a one to one ratio between each product tank, product conduit and mini tank; however, in other embodiments, there may be one product tank that feeds two or more mini tanks via corresponding product conduits.

Some embodiments of the present disclosure further include a cleanout system, the cleanout system comprising a conveyancing mechanism enclosed by a housing, the housing including a plurality of openings connected to corresponding cleanout funnels of each product tank. Each cleanout funnel includes a shutter door for selectively opening the product tank into the cleanout funnel so as to allow agricultural product within the mini tank to flow into the housing and onto the conveyancing mechanism so as to convey the agricultural product from each product tank to a cleanout outlet.

In one aspect of the present disclosure, a product transfer system for providing a continuous supply of a plurality of agricultural products from a plurality of product tanks to an array of metering assemblies comprises an electronic controller and a bulk transfer cart comprising a plurality of product tanks, wherein each product tank of the plurality of product tanks feeds into a corresponding product conduit that is selectively pressurized with air from a cart air source. Each product conduit is fluidly connected to a corresponding mini tank mounted on a central frame, the central frame coupled to an array of metering assemblies, each mini tank comprising a housing having a plurality of walls, a floor and a ceiling defining an interior cavity of the mini tank for receiving the agricultural product from a product inlet, each mini tank further comprising a level sensor, in communication with the electronic controller. Each mini tank has a plurality of pickup nozzles extending into said interior cavity, each pickup nozzle of the plurality of pickup nozzles incorporating a Venturi assembly and coupled to a metering conduit to convey the agricultural product from the mini tank to at least one metering assembly of the array of metering assemblies, wherein each metering assembly includes a local product reservoir sandwiched between the corresponding metering conduit and a metering device, the local product reservoir having a screen open to an atmosphere surrounding the product transfer system.

Each mini tank is in fluid communication with a first air source via a first air source manifold and a first air source conduit, wherein a first air stream generated by the first air source is pushed through a plurality of screened vents in the floor of the mini tank housing so as to entrain said agricultural product held within the interior cavity of the mini tank in the first air stream, the first air stream carrying said entrained agricultural product through the plurality of pickup nozzles and the corresponding metering conduits to a corresponding metering assembly. A second air source is in fluid communication with a point of constriction of each said Venturi assembly, the second air source generating a second air stream pushed through a second air manifold, a second air source conduit and the point of constriction of each said Venturi assembly of each said pickup nozzle so as to combine with the first air stream and thereby accelerate the entrained agricultural product of the first air stream through the plurality of pickup nozzles and corresponding metering conduits. When the level sensor of a mini tank detects the mini tank is nearly full, the controller generates a signal to shut off the cart air source supplied to the mini tank's corresponding product conduit so as to halt the conveying of agricultural product from the product tank to the corresponding mini tank. When the level sensor detects the mini tank is nearly empty, the controller generates a signal to turn on the cart air source cart air source supplied to the mini tank's corresponding product conduit to resume conveying the agricultural product from the product tank to the corresponding mini tank. Thereby, agricultural product is continuously supplied from each mini tank to each metering assembly of the array of metering assemblies via the plurality of pickup nozzles and corresponding plurality of metering conduits by the first and second air streams, as the intermediate mini tank is located upstream of the metering assemblies and downstream of the product tank and cart air source. Preferably, a pressure of the second air stream generated by the second air source is greater than a pressure of the first air stream generated by the first air source, creating a pressure differential so that a pressure of the said interior cavity of the mini tank is less than a pressure of the mini tank's corresponding metering conduit.

In another aspect of the present disclosure, an intermediate mini tank of a bulk product transfer system for providing a continuous supply of a plurality of agricultural products from a plurality of product tanks to an array of metering assemblies, the intermediate mini tank being downstream of a product tank of the said plurality of product tanks and upstream of a local product reservoir that is adjacent a metering assembly of the said array of metering assemblies, the bulk product transfer system including a bulk transfer cart supporting the plurality of product tanks, the bulk transfer cart towed behind a central frame, the central frame coupled to the array of metering assemblies, wherein each product tank of the plurality of product tanks feeds into a corresponding product conduit that is selectively pressurized with air from a cart air source, each metering assembly of the array of metering assemblies including said local product reservoir sandwiched between a corresponding metering conduit and a metering device, the local product reservoir having a screen open to the atmosphere surrounding the product transfer system, the bulk transfer system further comprising a first air source in fluid communication with a first air source manifold and a first air source conduit and a second air source manifold and a second air source conduit. The intermediate mini tank comprises a housing having a plurality of walls, a floor and a ceiling defining an interior cavity of the mini tank for receiving the agricultural product from a product inlet, each mini tank further comprising a level sensor, in communication with an electronic controller. The intermediate mini tank also comprises a plurality of pickup nozzles extending into said interior cavity, each pickup nozzle of the plurality of pickup nozzles incorporating a Venturi assembly and coupled to the said corresponding metering conduit to convey the agricultural product from the mini tank to at least one metering assembly of the said array of metering assemblies. Each mini tank is in fluid communication with the said first air source via the first air source manifold and the first air source conduit, wherein a first air stream generated by the first air source is pushed through a plurality of screened vents in the floor of the mini tank housing so as to entrain said agricultural product held within the interior cavity of the mini tank in the first air stream, the first air stream carrying said entrained agricultural product through the plurality of pickup nozzles and the corresponding metering conduits to a corresponding metering assembly of the said array of metering assemblies. The said second air source is in fluid communication with a point of constriction of each said Venturi assembly, the second air source generating a second air stream pushed through the said second air manifold, said second air source conduit and the point of constriction of each said Venturi assembly of each said pickup nozzle so as to join the first air stream and thereby accelerate the entrained agricultural product of the first air stream through the plurality of pickup nozzles and corresponding metering conduits.

When the level sensor detects the mini tank is nearly full, the controller generates a signal to shut off the cart air source supplied to the mini tank's corresponding product conduit so as to halt the conveying of agricultural product from the product tank to the corresponding mini tank. When the level sensor detects the mini tank is nearly empty, the cart air source is supplied to the mini tank's corresponding product conduit to resume conveying the agricultural product from the product tank to the corresponding mini tank. Agricultural product is thus continuously supplied from each mini tank to each metering assembly of the array of metering assemblies, on demand, via the plurality of pickup nozzles and corresponding plurality of metering conduits by the first and second air streams. A pressure of the said interior cavity of the mini tank is less than a pressure of the said corresponding metering conduit of the mini tank when the mini tank is installed on a bulk product transfer system in operation.

BRIEF DESCRIPTION OF THE FIGURES

FIG. 1A is a top plan view of an embodiment of the seeding and planting system in accordance with the present disclosure.

FIG. 1B is a top plan view of a prior art planting system.

FIG. 2 is a side profile view of the seeding and planting system illustrated in FIG. 1.

FIG. 3 is a side profile view of the bulk transfer cart of the seeding and planting system shown in FIG. 1.

FIG. 4 is a schematic illustration of an embodiment of the cart air source pathway from the cart air source to each of the metering assemblies, in accordance with the present disclosure.

FIG. 5 is a schematic illustration of an embodiment of the plurality of mini tanks and the first and second air sources, in accordance with the present disclosure.

FIG. 6 is a section perspective view of an embodiment of a mini tank, in accordance with the present disclosure.

FIG. 7 is a rear profile view of an embodiment of the bulk transfer cart, in accordance with the present disclosure.

FIG. 8 is a section view of the mini tank shown in FIG. 6.

FIG. 9 is a close-up of a portion of the pickup nozzle assembly shown in FIG. 8.

FIG. 10 is a schematic illustration of an embodiment of the cleanout system 60, in accordance with the present disclosure.

FIG. 11 is a close up perspective view of a routing manifold on the central frame, in accordance with the present disclosure.

FIG. 15 is a perspective cut away view of the bottom portion of an embodiment of the side tank having a slide gate valve and a pitot tube.

FIGS. 16A and 16B are top plan views of the side tank shown in FIG. 15, showing the slide gate valve in closed and opened positions, respectively.

DETAILED DESCRIPTION

Figure 1B:
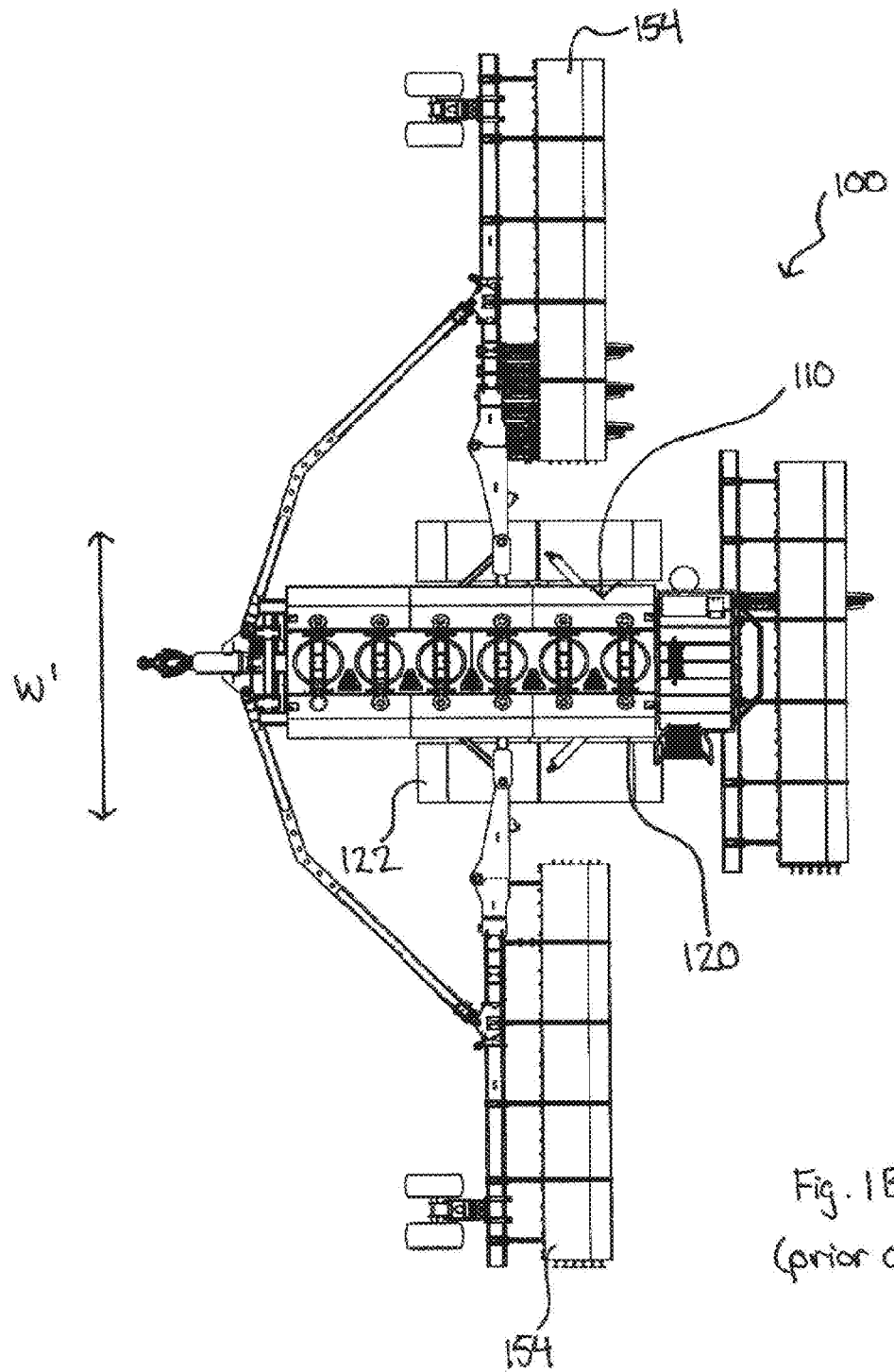

The bulk transfer system disclosed herein, in one aspect, improves previous bulk product transfer designs by shifting the bulk of the weight of the agricultural products to a tow-behind product trailer, rather than supporting the bulk of the weight on a frame proximate the seeding drill arms. In doing so, a greater volume and weight of the bulk product carried on the trailing air cart, as compared to prior art designs, thereby decreasing the frequency of stopping operations to re-fill the bulk product tanks. During use of the seeding and planting system, the bulk agricultural products are each continuously transferred from the tow-behind trailer to a plurality of intermediate miniature tanks (hereinafter referred to as "mini tanks"), which are positioned on the central frame of the seeding and planting system, downstream of the tow-behind bulk product cart and upstream of the metering assemblies, which advantageously provides for a continuous supply of the agricultural product from each mini tank to the plurality of metering assemblies for that product without loading the central frame adjacent the metering assemblies with the heavy weight of the bulk product.

In one aspect of the present disclosure, variable ratio blending of multiple agricultural products, which may include granular products such as seeds, pelletized fertilizer or other fertilizers or nutrients, for example, may be applied to prescription farming, so as to deposit the seeds and other agricultural products precisely and accurately into the field according to a field prescription, while reducing the need to halt operations when the bulk product tanks need to be re-filled, because by shifting the weight of the bulk product tanks to a bulk product cart towed behind the central frame, larger volume bulk product tanks may be utilized on the bulk product cart. This new arrangement thereby provides for the on-demand and continual supply of multiple agricultural products, from the bulk product tanks to the individual metering assemblies via the intermediate mini tanks, without having all of the weight of the bulk agricultural products carried on the central frame adjacent the metering pods or clusters on the seeding drill arms.

In one aspect of the present disclosure, shifting of the weight distribution of the bulk of the product to the tow-behind cart is accomplished by breaking down the bulk transfer process into two stages. In the first stage, the bulk transfer cart utilizes an air transfer system for transferring the agricultural products held in each bulk product tank 12 (and/or the side tank 14) on the bulk transfer cart to a corresponding, intermediate mini tank 22 carried on central frame 20 that is adjacent the array of metering pods 30. In some embodiments, there may be a one-to-one ratio between the mini tanks 22 and the plurality of bulk product tanks 12 and/or side tanks 14, and/or one bulk product tank 12 may supply two or more mini tanks 22. Using the product transfer system, which will be further described below, the agricultural product is conveyed from each of the bulk product tanks 12 (or side tank 14) to the corresponding pressurized mini tank 22, utilizing sensors on the mini tank 22 to ensure that the mini tank is never empty nor exceeds capacity when the system is in use. In the second stage, the agricultural product is continuously supplied from each mini tank to each of the individual metering assemblies 50 in the array of metering pods 30 in order to supply, for example, one or two rows with that agricultural product. In some embodiments, each metering pod 30 contains a plurality of individual metering assemblies 50 configured to supply different agricultural products to a single opener at a specified application rate for each agricultural product. As described herein, the agricultural product may be a granular agricultural product, which may include for example: seeds, fertilizer, nutrients, soil amendments and/or pesticides provided in a granular or pelletized formulation.

Each mini tank of the plurality of mini tanks holds relatively small volumes of agricultural product; for example, without intending to be limiting, the mini tanks may hold one bushel of agricultural product, or may hold volumes in the range of approximately one to five bushels of agricultural product, while the side tank or bulk product tanks on the bulk transfer cart each hold in the range of 40 to 325 bushels. As such, the total weight being carried on the central frame 20 is significantly less than if the central frame 20 was carrying the plurality of bulk product tanks. This provides for easier movement of the central frame 20 across a field, which central frame also supports the seeding drill arms 54, because the overall footprint of central frame 20, when the seeding drill arms 54 are folded in direction C in a transport configuration, is reduced, as well as having an overall reduced weight of the central frame 20 when the mini tanks are loaded with product during operations.

For the purpose of comparison, and not intended to be limiting, see for example a top plan view of a prior art seeder 100 illustrated in FIG. 1B, which includes an array of six bulk product tanks 110 carried on a frame 120 adjacent a pair of seeding drill arms 154, 154. Due to the size and weight of the product tanks 110 carried on frame 120, large tracks 122 are used instead of wheels for the transport of the product tanks on frame 120. It may also be observed that the transport width W' of the prior art seeder 100 is 28 feet (28'), which is larger than the transport width W of the central frame 20 of the present disclosure, measuring approximately 18 feet and two inches (18' 2"). This substantial difference in the transport width W of the central frame 20, as compared to the transport width W' of the frame 120 of the prior art device, may enable easier transportation of the equipment from one field to another, particularly when roads are used for travel.

Each of the components of the seeding and planting system 1 will now be described below, with reference to the Figures.

Bulk Transfer Product Cart

The bulk transfer product cart 10, in an embodiment the present disclosure, includes an array of four large, non-pressurized product tanks 12 arranged side-by-side longitudinally along the length of the bulk transfer product cart frame 11. Advantageously, because the product tanks 12 are not air tight and the interior of each tank 12 is at ambient pressure, such bulk product tanks 12 are less expensive to manufacture as compared to pressurized air-tight bulk product tanks of prior art systems. Each of the bulk product tanks 12 includes a bottom 13, which may be hopper-shaped, with an opening that feeds into a rotary air lock 15, which is an off-the-shelf component. The rotary air lock 15 includes a blade tightly journaled within an air-tight casing. When the air lock 15 is actuated, agricultural product falls through the opening of the hopper-shaped bottom 13 into the rotating blades of the air lock 15, and as the air lock blades rotate, the agricultural product is transferred into a pressurized cart hopper 16 beneath the air lock. The cart hopper 16, which is air-tight, is in fluid communication with the product conduit 18 into which the agricultural product flows from the cart hopper 16, which product conduit 18 is pressurized by the cart air source 42. As such, the cart hopper 16 is pressurized by the pressurized product conduit 18.

The bottom of the pressurized cart hopper 16 opens into a dedicated product conduit 18. The product conduit 18 receives the agricultural product from the pressurized cart hopper 16, and is then pushed through the product conduit by the cart air source 42 to a corresponding mini tank 22 on the central frame 20 ahead of the bulk transfer cart. The pressurized cart hopper includes a level sensor 17, which is in communication with an electronic controller for controlling the air lock. When the sensor 17 indicates the volume of accumulating agricultural product within the cart hopper has reached a certain level, the electronic controller temporarily shuts off the air lock to halt the flow of agricultural product from the large product tank 12 into the pressurized cart hopper 16, so as to avoid a backup of product between the cart hopper 16, allowing air from the cart air source 42 to clear the accumulated product from the cart hopper 16 by pushing the accumulated product through the corresponding product conduit 18. After a period of time, when the level sensors of the cart hopper 16 detect that the product conduit 18 is sufficiently clear, the air lock 15 is actuated to re-initiate transfer of the agricultural product from the bulk product tank 12 to the cart hopper 16.

In one aspect of the present disclosure, the product transfer system includes a cart air source 42, the cart air source 42 supplying air to a cart air source manifold 40. The cart air source manifold 40 includes a plurality of manifold outlets 40a, each cart air source manifold outlet 40a coupled to a ball valve 44 and a corresponding product conduit 18. For clarity, the schematic view of the product transfer system shown in FIG. 4 only includes a single ball valve 44 and a single product conduit 18 leading from the cart air source manifold 40 to a single product tank 12 and a single mini tank 22. The transfer of agricultural product from the cart hopper 16 to the mini tank 22 is controlled by actuating the corresponding ball valve 44 to either turn on or shut off the supply of air from the cart air source 42 to the corresponding product conduit 18. It is the pressure supplied by the cart air source 42 through the plurality of product conduits 18 which pushes the agricultural product through the product conduits 18 to their corresponding mini tanks 22.

As will be further described below, the electronic controller is also in communication with level sensors 24a, 24b of the mini tank 22. Based on signals received from the level sensors 24a, 24b of the mini tank 22, the ball valves 44 may be actuated in an open or closed position so as to start or stop the flow of agricultural product from the product conduits 18 into the mini tank 22. For example, when the level sensors 24a, 24b indicate that the mini tank is reaching capacity, the corresponding ball valve 44 that controls the supply of air through the conduit 18 supplying product to that mini tank will be closed so as to prevent air from cart air source 42 flowing through that product conduit 18, thereby temporarily halting the transfer of product from tank 12 to the corresponding mini tank 22. On the other hand, when the level sensors 24a, 24b indicate that the mini tank is becoming empty and requires more agricultural product, the corresponding ball valve 44 will be opened so as to allow air from the cart air source 42 to flow through the mini tank's product conduit 18 and once again transfer product from the tank 12 to the mini tank 22.

It will be appreciated by a person skilled in the art that other embodiments may include multiple cart air sources 42 providing air to the product conduits 18; for example, there could be one cart air source 42 providing air to each product tank 12. However, advantageously, the applicant finds that product transfer may be controlled effectively for a plurality of product tanks 12, 14 without the expense of providing multiple cart air sources 42, and selectively controlling the flow of product from any particular product tank 12, 14 by utilizing the cart air source manifold 40 and ball valves 44 to selectively turn on or off the flow of air through any particular conduit 18. It will also be appreciated that, in some embodiments, the speed of the cart air source 42 may be controlled or adjusted so as to vary the air pressure flowing through the plurality of product conduits 18, so as to ensure a substantially consistent pressure airflow through the plurality of product conduits 18; such as, to adjust for increases or decreases in pressure in the conduits 18 that may occur upon opening or closing one or more of the ball valves 44. For example, pressure sensors located so as to be in communication with the plurality of product conduits 18 may indicate when the overall system has experienced a pressure drop, such as below 3 or 4 psi, thereby requiring increased pressure to be provided by the cart air source 42. Such a situation may occur, for example, when all of the ball valves 44 are open and air is being supplied to each of the plurality of product conduits 18. Conversely, when a number of ball valves 44 are closed, there may be a pressure increase in the remaining product conduits 18 because fewer product conduits 18 are being supplied in the moment by the cart air source 42, therefore requiring a reduced cart air source speed so as to reduce the pressure to the target pressure range of, for example, approximately 3 to 4 psi.

Figure 4:
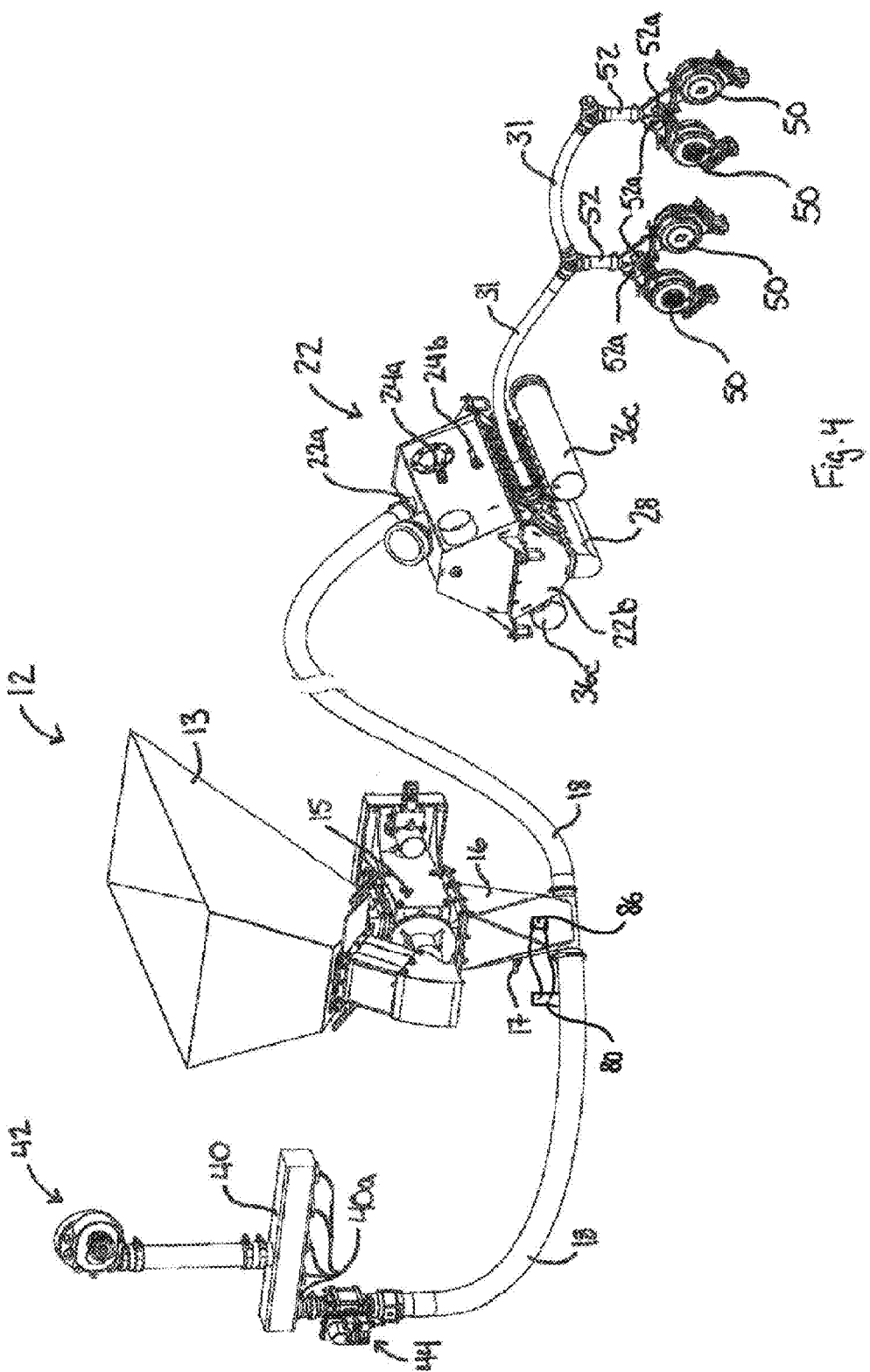

In some embodiments, such as illustrated in FIG. 4, a pitot tube assembly 80 may be provided on the product conduit 18, upstream of the pressurized hopper 16. The pitot tube assembly 80 may be in communication with a differential pressure sensor 86 and the electronic controller. The pitot tube assembly and differential pressure transmitter may be used to measure air velocity in the product conduit 18. If the pressure is maintained at a target pressure, for example 6 psi, then a decrease in the air flow in product conduit 18, as measured by the pitot tube assembly 80, indicates that there is too much agricultural product in the pressurized hopper 16, thereby indicating that the air lock should be temporarily slowed down or deactivated so as to enable the product accumulated in the hopper 16 to be cleared through the product conduit 18. Thus, although the flow of product from the bulk product tank 12 to the hopper 16 through the air lock 15 may be primarily controlled by the hopper level sensors 17, as described above, the use of the pitot tube assembly 80 and differential pressure sensor 86 may be used as a secondary or redundant control mechanism for controlling the speed of the air lock 15 and the flow of product into product conduit 18.

Some embodiments of the bulk transfer cart 10 include one or more side tanks 14. The side tank 14 may have a reduced capacity; for example, without intending to be limiting, the side tank may have a capacity of 40 bushels, while the other four bulk product tanks 12 may have capacities ranging between 70 bushels and 325 bushels. The smaller capacity side tank 14 is positioned laterally of the large tanks 12 on the cart frame 11, and at a lower elevation relative to the four larger product tanks, such that the access hatch 14b at the top of the side tank 14 is at a lower elevation than the access hatches 12b located at the top of each of the larger product tanks 12. Advantageously, positioning the side tank 14 at a relatively lower elevation facilitates manual loading the side tank 14 with product, whereby an individual may access a standing platform 14d using stairs 14c or a ladder, so as to load the tank 14 with a number of bags of product by hand. The side tank 14 may be particularly useful for high value products, such as canola seed, where relatively small volumes are required for planting as compared to the fertilizer and other agricultural products, such as micronutrients or pesticides, that may be applied to the ground during planting. Because such small-volume products may be much more expensive compared to the other products, the ability to manually load the small volume products is convenient and reduces possible loss of product during transfer into the side tank that may otherwise occur when loading the tank by other means, such as by a conveyor system.

The side tank may also include a hopper-shaped bottom 13 which feeds directly into a corresponding product conduit 18, whereby the opening at the bottom of the side tank leads into the product conduit, forming a T-shaped junction between the side tank 14 and the product conduit 18. Unlike the bulk product tanks 12, which each include an airlock between the tank bottom 13 of the bulk product tank 12 and the corresponding product conduit 18, there is no airlock between the bottom 13 of the side tank 14 and the corresponding product conduit 18. However, to assist the transfer of product from the side tank 14 into its corresponding product conduit 18, the side tank 14 may be airtight and sealed so as to be pressurized by the air flowing through the product conduit 18, as there is nowhere for the air to escape as it flows through product conduit 18 and side tank 14. Providing a sealed side tank 14 that feeds directly into the product conduit 18 allows sufficient clearance beneath the side tank 14 which is at a lowered elevation to allow ease of access for manual loading. However, applicant notes that this is not intended to be limiting, and that an airlock may be used underneath the side tank if the side tank was positioned at a higher elevation in order to provide the clearance beneath the side tank. The side tank is an optional feature, and bulk transfer carts which do not include a side tank fall within the scope of the present disclosure.

In some embodiments, as illustrated in FIGS. 15, 16A and 16B, the product conduit 18 corresponding to the side tank 14 may also include a pitot tube assembly 80 having a pitot tube 82 for measuring the air velocity in the product conduit 18 upstream of the side tank hopper bottom 13, and differential pressure transmitter 86. Both the pitot tube assembly 80 and the differential pressure transmitter 86 are in communication with an electronic controller. The electronic controller is also in communication with a linear actuator 85, the linear actuator 85 mounted to the side tank hopper bottom 13 and a slider tube 87, the slider tube 87 being slidably mounted over the product conduit 18. The linear actuator 85 may be controlled by an electric motor 85a, or in other embodiments may be a hydraulic linear actuator.

The linear actuator 85 and slider tube 87 together form a slide gate valve 89 for controlling the flow of product from the pressurized side tank 14 to the corresponding product conduit 18. As an illustrative example, in some embodiments the air velocity flowing through product conduit 18, as supplied by the air cart source 42, may need to be in the range of 3,400 to 4,000 feet per minute (62 to 73 km/hr), which is approximately equivalent to 0.75 to 1.0 inches of water (187 to 249 Pa), as measured by the pitot tube 82. The differential pressure in the product conduit 18, as measured upstream of the hopper bottom 13 of the side tank 14 by the pitot tube assembly 80, is monitored by the electronic controller which sends control signals to the linear actuator 85 and motor 85a. The linear actuator 85 is operative to move the slider tube 87 in directions J and K, and the slider tube 87 is used to control the size of the opening 18c leading from the hopper bottom 13 to the product conduit 18. When slider tube 87 is moved in direction K, the opening 18c is reduced in size or may be completely covered, so as to reduce or stop the flow of product from side tank 14 into the corresponding product conduit 18, such as shown in FIG. 16A. When slider tube 87 is moved in direction J, the opening 18c is increased in size or may be completely opened, so as to increase the flow of product from the side tank 14 into the corresponding product conduit 18, such as shown in FIG. 16B. Thus, if the air velocity, as measured by the pitot tube assembly 80 and differential pressure transmitter 86, drops below a configurable lower threshold, then the actuator 85 is operated to slide the slider tube 87 in direction K, to stop the flow of agricultural product into product conduit 18 so as to allow the accumulated product to be pushed through the product conduit 18 and avoid a blockage. As the accumulated product is pushed through the product conduit 18 so as to clear the accumulated product from beneath the side tank 14, the air velocity will increase, and once the detected air velocity increases above a configurable upper threshold, the actuator 85 is operated by the electronic controller to slide the slider tube 87 in direction J so as to unblock the opening 18c and thereby allow product to continue transferring from the side tank 14 to the corresponding product conduit 18. In some embodiments, the electronic controller may be configured such that the slide gate valve 89 is maintained in the open or closed positions, as the case may be, when the measured air velocity is between the upper and lower thresholds.

Mini Tanks

As best viewed in FIG. 4, each of the bulk product tanks 12, and the optional side tank 14, feeds product into a corresponding product conduit 18 as described in more detail above. From the product tank 12, the product is pushed through the product conduit 18 to a corresponding mini tank 22 through a product inlet 22a. The mini tank, which may have a capacity of approximately one bushel, holds a small reserve of product on the central frame 20. The central frame 20 supports a plurality of mini tanks. In some embodiments, the number of mini tanks may be equal to the number of bulk transfer tanks 12 and side tank 14; in other embodiments, more than one mini tank may be provided with product from a single bulk transfer tank or side tank. In the embodiment illustrated in the Figures, there are six mini tanks 22, with four of the mini tanks configured to receive product from one of the four bulk product tanks 12, and the remaining two mini tanks each configured to receive product from the side tank. However, it will be appreciated that this configuration is not intended to be limiting. Furthermore, it will be appreciated that the configuration of which product tank feeds which mini tank may be easily reconfigured in some embodiments where a routing manifold 19 is provided, which will be further described below.

Each mini tank also includes a set of level sensors 24a, 24b, which are in communication with the electronic controller, for indicating when the mini tank is nearly full or nearly empty. Signals from the level sensors 24a, 24b are sent to the electronic controller, which controls the flow of agricultural product from a bulk product tank 12 or side tank 14 to the mini tank 22. For example, when the mini tank level sensors indicate the mini tank is full, a ball valve 44 coupled to the corresponding product conduit 18 is shut off by the electronic controller to prevent air from the cart air source 42 from flowing through that product conduit, thereby temporarily halting the flow of product from the product tank 12 or 14 to the mini tank 22. Conversely, when the level sensors of the mini tank indicate the tank is nearly empty, the ball valve controlling the supply of air to that mini tank's corresponding product conduit 18 is opened, by the electronic controller, thereby allowing air from the cart air source 42 to flow once again through that product conduit for transferring agricultural product to the corresponding mini tank 22. The level sensors may include optical sensors, proximity sensors, or any other type of sensor known to a person skilled in the art that detects the presence and/or absence of agricultural product within the mini tank.

Figure 5:
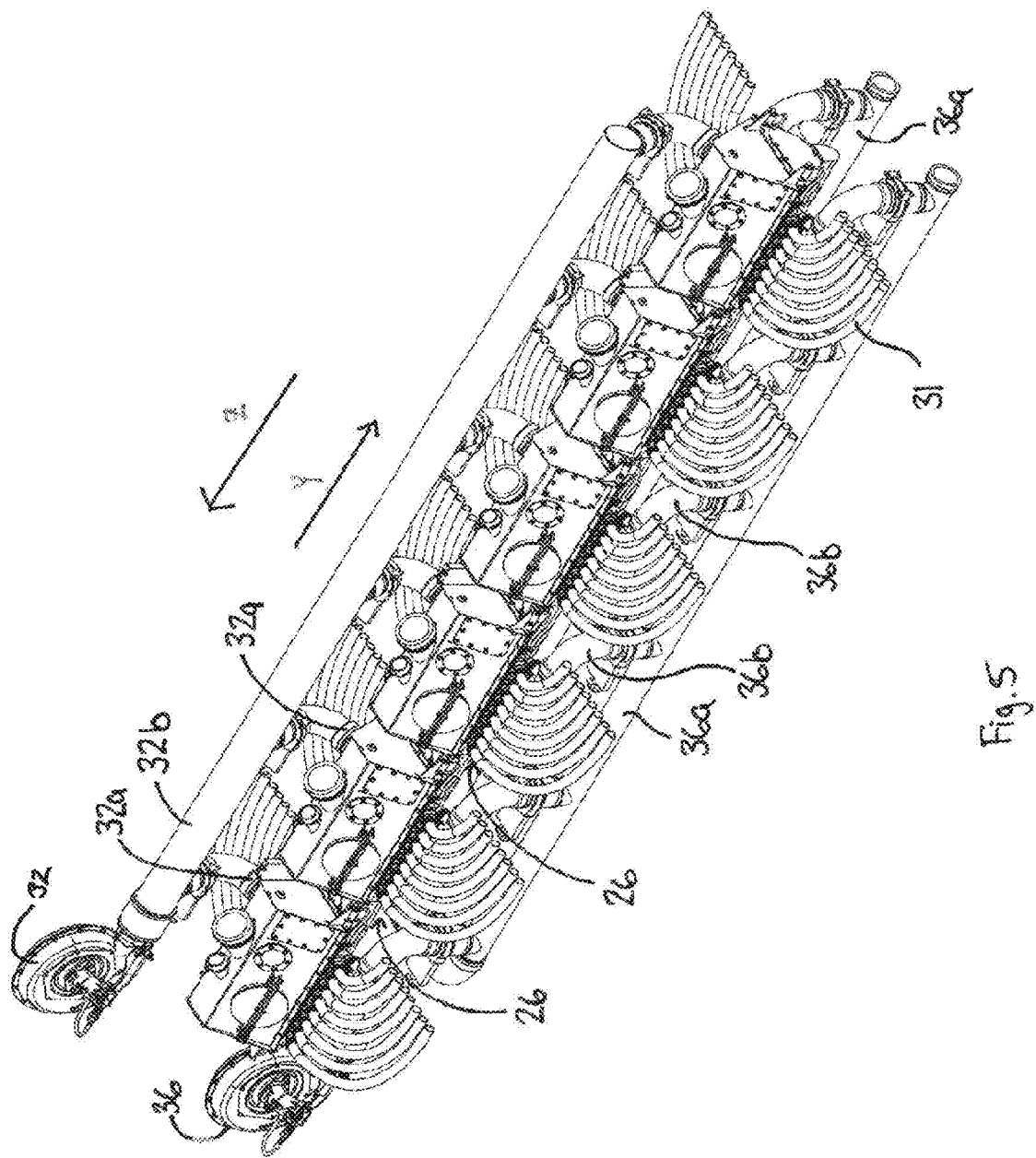
Figure 6:
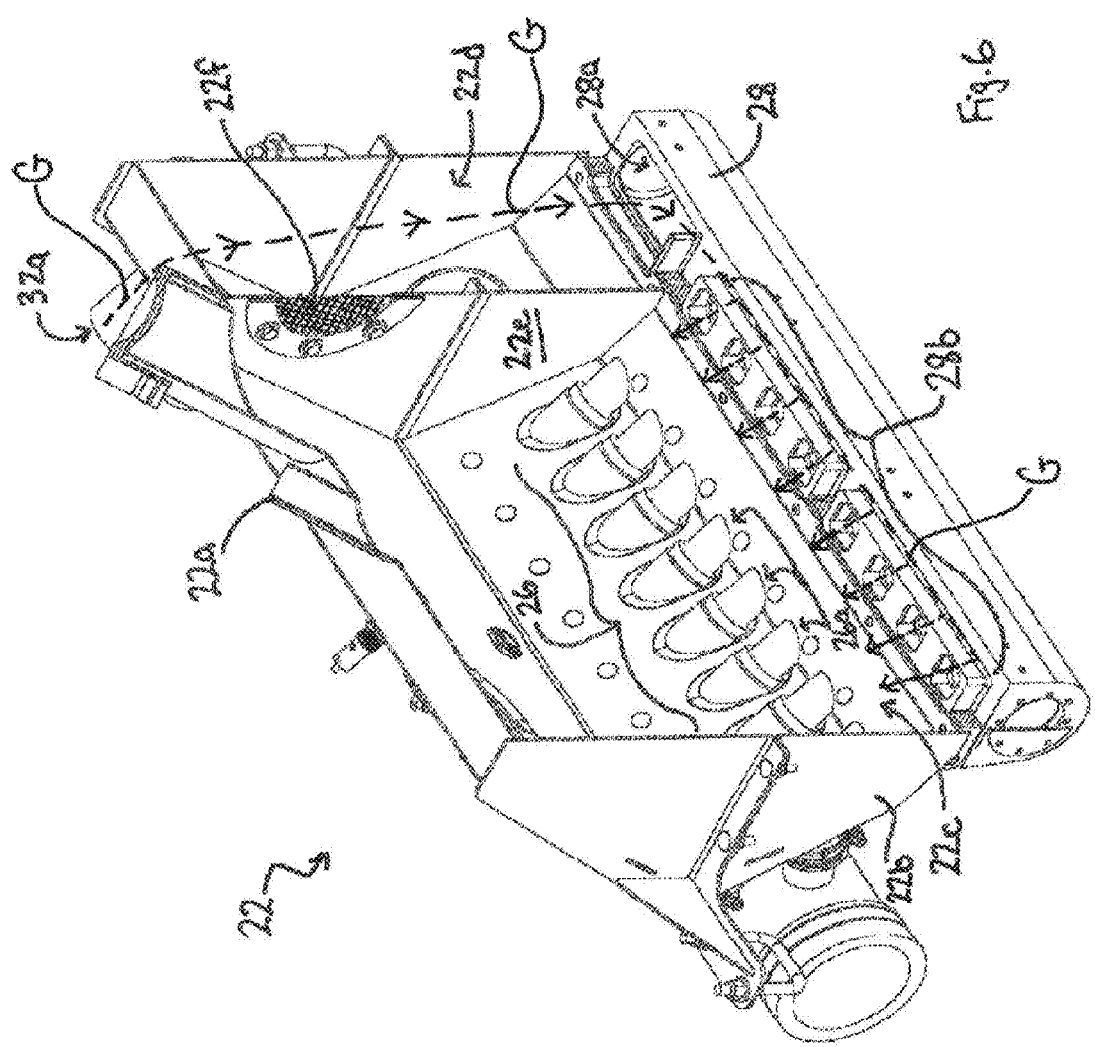

As best viewed in FIGS. 5 and 6, agricultural product flows into the cavity 22c of the mini tank 22 through product inlet 22a. Additionally, air from a product or first air source 32, which air source may include a fan, blower, or any other source of pressure regulated air, is supplied to each mini tank through the product or first air inlet 32a, carried to each mini tank through the product or first air manifold 32b in direction V. As shown in FIG. 6, the mini tank may include an air chamber 22d which is separated from the product cavity 22c by an internal wall 22e having a screened portion 22f, which screened portion 22f enables air pressure equalization to occur between the product cavity 22c and the air chamber 22d, while preventing agricultural product from entering the air chamber 22d.

Pressure regulated air from the first air source 32 travels through the air chamber 22d and enters a product air cavity 28, positioned beneath a floor of the mini tank 22, through inlet 28a. From the product air cavity 28, the air from the first air source 32 then flows through a plurality of screened vents 28b on the floor the mini tank housing 22, which vents 28b are in fluid communication with the product cavity 22c of the mini tank 22. Because the agricultural product is settled on the bottom 22b of the mini tank 22, the air from the first air source 32 flowing through the plurality of screened vents 28b of the product air manifold 28 flows through the volume of agricultural product, thereby agitating the product and entraining it in the airstream. The entrained agricultural product then flows through the inlets 26a of each nozzle of the array of nozzles 26. The flow path G of the first air stream generated by the first air source, as it travels through the mini tank 22, is shown diagrammatically in FIG. 6 by arrows G.

In some embodiments, the first air source manifold 32b may be configured so as to be positioned adjacent the product air cavity 28, wherein the air from the first air source enters the air cavity 28 through a conduit (not shown) connecting the first air source manifold 32b to the product air cavity 28. In such embodiments, the mini tank 22 would not include the internal wall 22e and the air chamber 22d, which structure provides for the routing of the first air stream G, generated by the first air source 32, from the inlet at the upper portion of the mini tank to the air cavity 28 underneath the mini tank.

Pick Up Nozzle Assemblies

Figure 8:
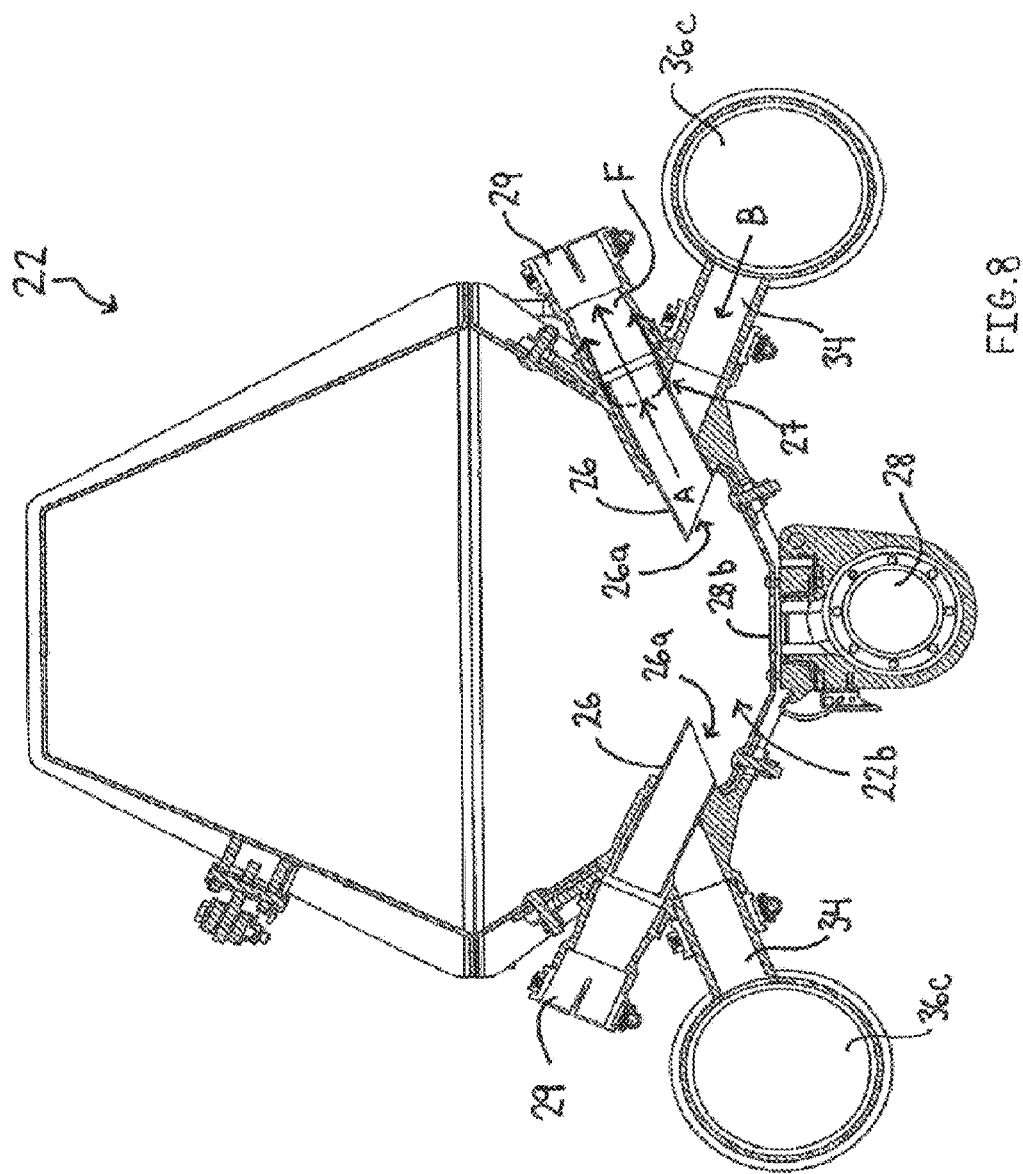
Figure 9:
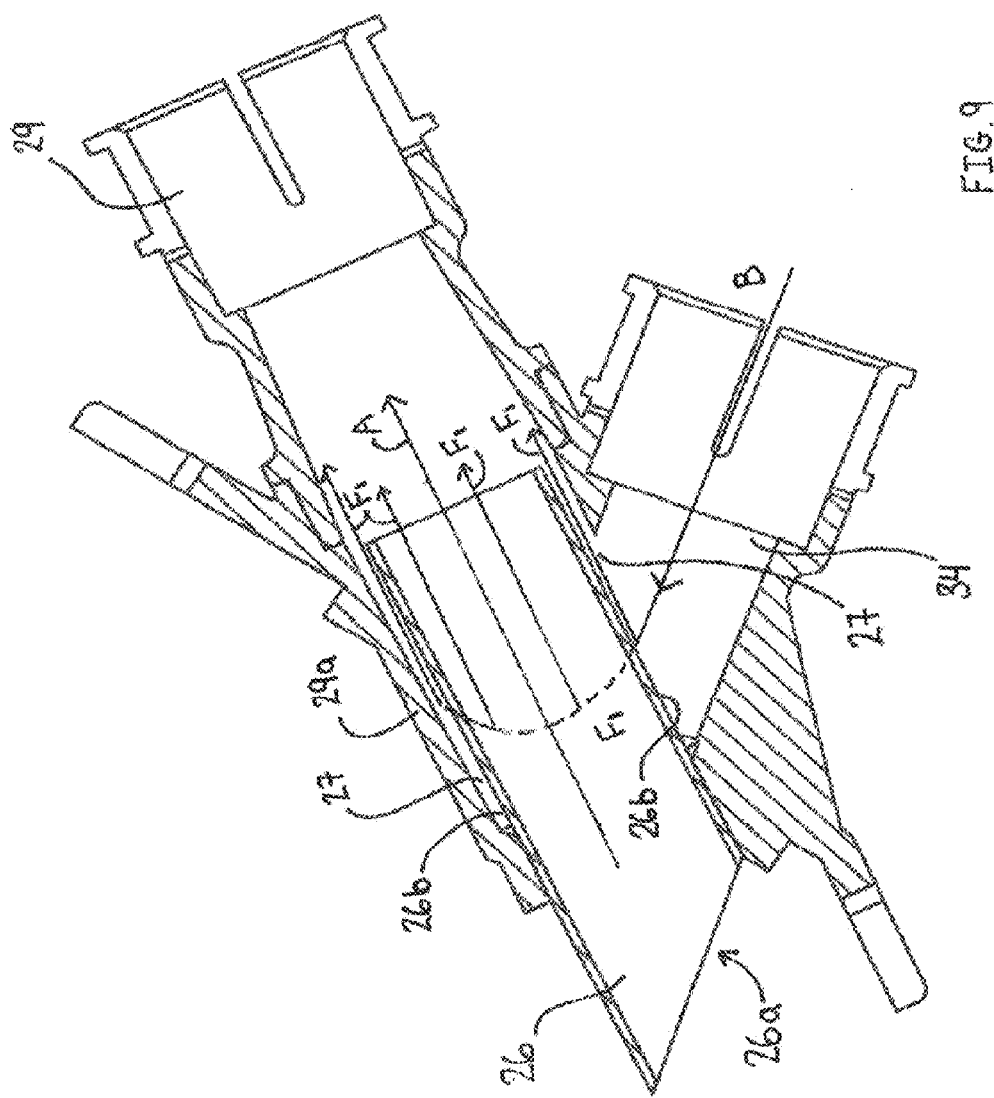

As best viewed in FIGS. 5, 8 and 9, each mini tank 22 includes one or more arrays of pick up nozzle assemblies 26. The pick up nozzle assemblies 26 are additionally in fluid communication with Venturi air passage 34, which receives air from a second, high pressure air source 36. The second air source 36 supplied to the nozzle assembly 26 through the Venturi air passage 34, which assists with accelerating the agricultural product from the mini tank 22 to the plurality of drills and metering assemblies 50, by creating a pressure difference between the product cavity 22c of the mini tank, and the metering conduits 31. For example, without intending to be limiting, there may be a pressure difference of five inches of water (1245 Pa) between the pressure within the mini tank 22 and the metering conduits 31, wherein the pressure within the metering conduits 31 is five inches of water (1245 Pa) greater than the pressure within the mini tank 22.

In one aspect, a Venturi effect is created by the second air stream, represented by arrows B and F in FIG. 9, wherein the second air stream travels through air passage 34 until it encounters an outer wall 26b of the nozzle assembly passage 26. When the second air stream B encounters the outer wall 26b of the nozzle assembly passage 26, the air stream B is forced through a point of constriction 27, which may be an annular space or cavity defined between the outer wall 26b of the nozzle assembly passage 26 and a conduit fitting 29a, the conduit fitting 29a attaching the metering conduit coupler 29 to the nozzle assembly passage 26. As the air stream B exits the annular space or cavity of the point of constriction 27, air stream B, now represented by flow path arrows F, is accelerated as a result of the Venturi effect, and air stream B combines with the first air stream A as air stream A passes through the nozzle assembly passage 26 into the metering conduit coupler 29 and then into the metering conduits 31. Advantageously, the applicant has found that integrating the Venturi point of constriction 27 within the nozzle assembly 26 itself reduces the possibility of blockages forming in a hose or conduit connecting a separate Venturi assembly to the nozzle assembly that exists in prior art designs.

Advantageously, the second or booster air source 36 generating the second air stream, which may include a fan or blower, supplies air at a higher pressure (as compared to the first air source 32), to the second or booster air source manifold 36a. A series of second air source conduits 36b connect the second air source manifold 36a to the array of pickup nozzle assemblies 26 of each mini tank 22. The conduits 36b supply air from the second air source 36 into a nozzle plenum 36c, and air supplied by the second air source flows from the nozzle plenum 36c through the Venturi air passage 34 and into the metering conduit coupler 29. Advantageously, this arrangement provides a second, higher pressure air stream, represented by arrows B and F, as compared to the lower pressure airstream generated by the first air source, represented in FIG. 8 by arrow A. The combination of the two air streams A and B/F, from the first and second air sources 32 and 36, with the second air source air stream B flowing through the point of constriction 27 thereby creating a Venturi effect, enables the acceleration of agricultural product through the pickup nozzle assembly 26 and metering conduit coupler 29 and then through the metering conduits 31 to each of the individual metering assemblies 50. Each metering conduit 31 coupled to a metering conduit coupler 29 of a nozzle assembly 26 carries the product from that mini tank 22 to a local product reservoir 52 for holding a small reserve of product supplied to one or more metering assemblies 50.

As mentioned elsewhere in the present disclosure, embodiments which use a single air source (32 or 36) to pressurize both the first air manifold 32*b* and the second air manifold 36*a* may require a different Venturi assembly, apart from the Venturi assembly described above, to establish the required pressure differential between the mini tank 22 and the metering conduits 31 such that the pressure of the metering conduits 31 exceeds the pressure of the mini tank 22.

During the transfer of product from a tank 12 or 14 to the mini tank 22, air from the cart air source 42 enters the product inlet 22*a*, carrying the agricultural product, into cavity 22*c* of the mini tank 22. Excess air pressure in product cavity 22*c* enters air chamber 22*d*, through the screened portion 22*f*, thereby equalizing the pressure between the product cavity 22*c* and the air chamber 22*d* of the mini tank 22. From the air chamber 22*d*, the excess high pressure air is then vented backwards through the first air source manifold 32*b* in direction Z and through the intake of the first air source 32. An open centrifugal fan configuration for the first air source 32 thereby acts as both an air supply and pressure regulator, allowing the backwards air flow and venting of any excess pressure buildup that may otherwise occur in the mini tanks 22 from the airstream generated by the cart air source 42. If the excess air pressure were not vented through screened portion 22*f* into the adjacent air chamber 22*d*, this excess air pressure would push excess agriculture product into the corresponding metering conduit 31, as the booster air pressure in conduit 31, generated by the second air source 36 (otherwise referred to as the booster air source 36), would no longer exceed the pressure within the mini tank product cavity 22*c*.

Due to the large number of metering assemblies 50 across the seeding drill arms 54, because the outermost metering assemblies 50 are located at the greatest distance away from the central frame 20, the applicant has observed in prior art air seeding and planting systems that it can be problematic to ensure that there is sufficient air pressure being supplied through metering conduits 31 to reach the outermost metering assemblies 50*a* at the distal ends of the seeding drill arms 54. However, the applicant finds that this issue may preferably be solved by the use of two air sources, including the lower pressure first air source 32 and the higher pressure second air source 36, in combination with the Venturi constriction point 27 included in each pick up nozzle assembly 26, so as to sufficiently accelerate the agricultural product through the metering conduits to push the agricultural product to the outermost metering assemblies 50*a* located the greatest distance away from the central frame 20. With that said, the applicant finds that the system may also work with a single air source for transferring some types of agricultural products, and that it is not required to include the second air source in some embodiments of the present disclosure. For example, such embodiments using a single air source (32 or 36) may be configured to pressurize both the first air manifold 32*b* and the second air manifold 36*a*. Such an embodiment may require a redesigned Venturi assembly in order to provide a pressure differential between the mini tank 22 and the manifold conduit 31 so that the pressure of the manifold conduit 31 exceeds the pressure of the mini tank 22, as is described elsewhere in the present disclosure.

The pressure difference between the interior of the mini tank 22 and the metering conduits 31, wherein the pressure within the metering conduits 31 is greater than the pressure within the mini tank 22, also enables the automatic shutting off of the product supplied through a given metering conduit 31 when the local product reservoir 52 is full of product. For example, the local product reservoir 52 may include a screen 52*a*, which allows the combined air streams A and B/F to be vented when the entrained agricultural product reaches the local product reservoir 52, which may be for example a wye 52 supplying two metering devices 50, 50. When the screen 52*a* of the local product reservoir 52 is blocked, the pressure within that local product reservoir 52 temporarily increases, creating a temporary air curtain and thereby causing the agricultural product, entrained in air streams A and B/F, to temporarily bypass the local product reservoir 52 with the blocked screen 52*a* and continue through the serially linked metering conduits 31 to supply the other metering devices 50. As the metering devices 50 at the blocked local product reservoir 52 continue to dispense the agricultural product, the blocked screen vent 52*a* becomes unblocked, at which point the entrained agricultural product will once again enter that local product reservoir 52. This feature thereby reduces the blockages that may otherwise occur in the metering conduits 31 when a local product reservoir, such as the wyes 52, become overfilled with agricultural product, while still enabling the substantially continual supply of agricultural product to each of the metering devices 50.

In the embodiments illustrated herein, not intended to be limiting, each mini tank includes two arrays of pickup nozzle assemblies 26 on each side of the mini tank 22, each array of nozzle assemblies including eight pickup nozzle assemblies 26, for a total of sixteen pickup nozzle assemblies per mini tank. As seen in FIG. 4, the metering conduit 31 carries the agricultural product from the mini tank to a cluster of four metering assemblies 50, configured to dispense the agricultural product supplied by that mini tank to four rows on a field. Because each pickup nozzle assembly 26 and metering conduit 31 supplies product to a total of four metering assemblies 50, and there are sixteen nozzle assemblies 26 in a mini tank 22, this configuration would enable one mini tank to supply a given agricultural product to a total of sixty-four metering assemblies. However, it will be appreciated that this is not intended to be limiting, and other configurations with different numbers of pickup nozzles and metering assemblies are within the scope of this present disclosure.

Figure 12:
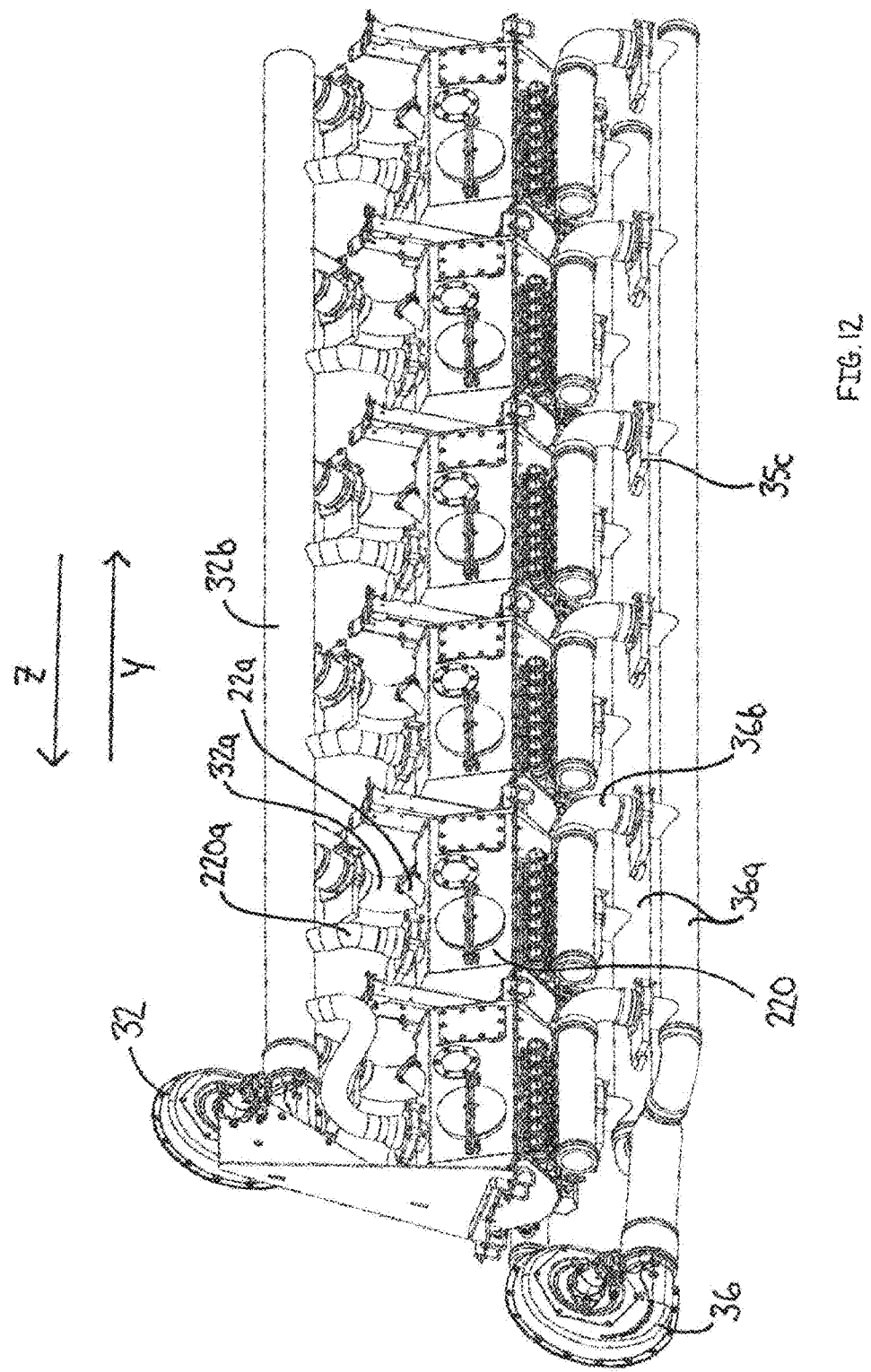
FIG. 12 is a schematic illustration of an embodiment of the plurality of mini tanks and the first and second air sources, in accordance with the present disclosure.
Figure 13:
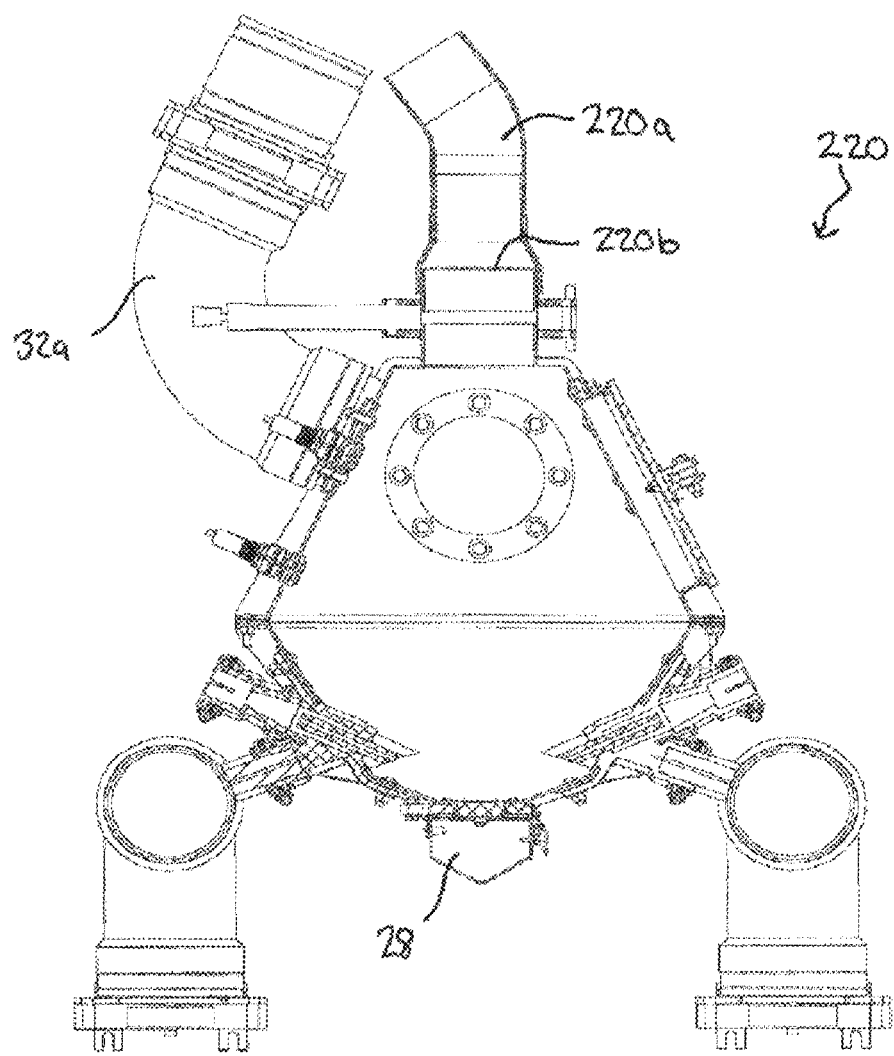
FIG. 13 is a rear profile section view of an embodiment of a mini tank shown in FIG. 12.
Figure 14:
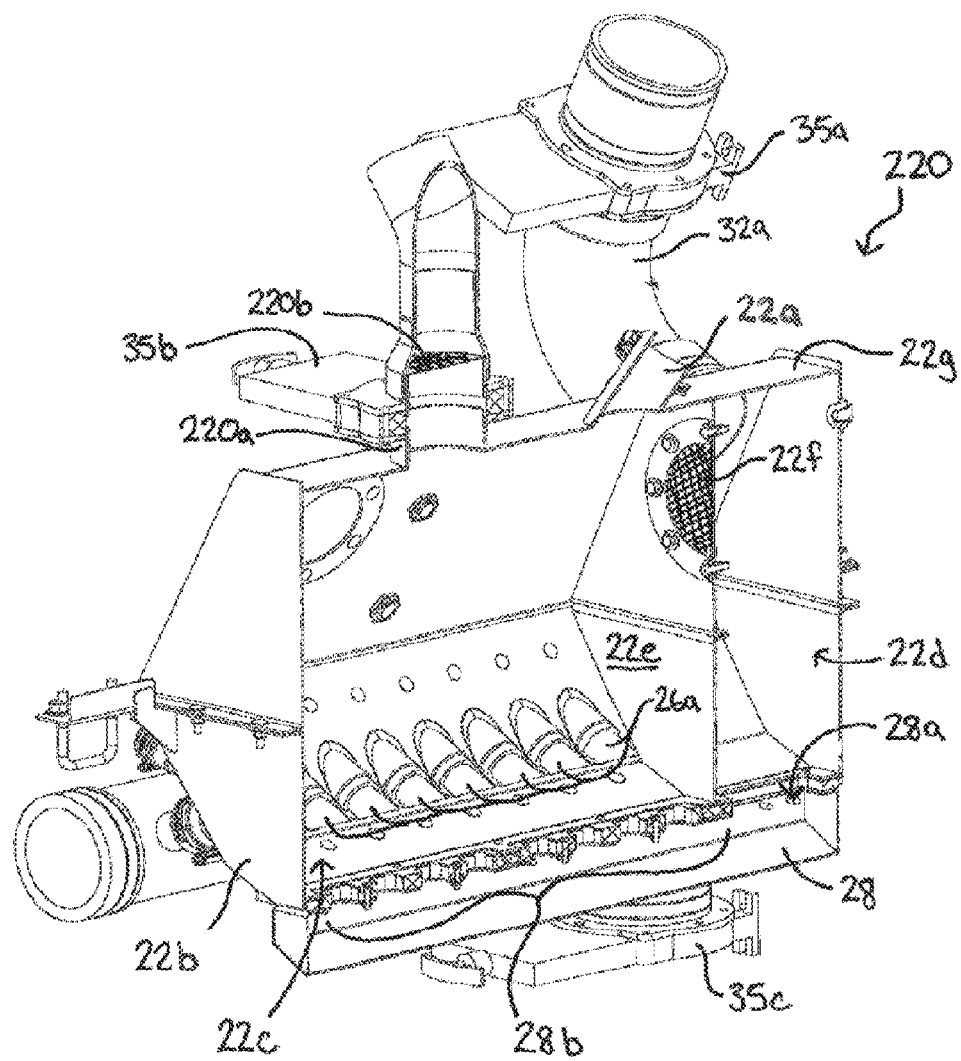
FIG. 14 is a section perspective view of the embodiment of a mini tank shown in FIG. 13.

As illustrated in FIGS. 12 to 14, a further embodiment of a mini tank 220 shares many of the features of the embodiments of the mini tank 22 described herein. However, the embodiment of the mini tank 220 includes an additional vent conduit 220*a* exiting the mini tank 22 through a ceiling 22*g* of the mini tank housing. The vent conduit 220*a* includes a screened vent 220*b*, enabling excess pressure to be vented through screened vent 220*b* while retaining entrained agricultural product within the cavity 22*c* of mini tank 22. As viewed in FIG. 12, the vent conduits 220*a* are each fluidly connected to the first air manifold 32*b*. In the embodiments of the mini tank 22 described elsewhere in the present disclosure, the excess pressure within mini tank 22 is vented through the screened portion 22*f* of interior wall 22*e*, and then through the first air inlet 32*a* and through first air manifold 32*b* in direction Z through the first air source fan or blower 32. However, in such embodiments the screened portion 22*f* may become blocked with agricultural product, which may slow down or halt the venting of pressure from mini tank 22 through inlet 32*a*. Thus, the Applicant has found that providing an additional vent conduit 220*a* and screened vent 220*b*, at the ceiling 22*g* of the mini tank housing 22, allows venting of excess pressure from the mini tank 22 even if the screened portion 22*f* becomes blocked by agricultural product. Such excess pressure vented through conduit 220a and screened vent 220b flows through air manifold 32b in direction Z and exits the system through first air source 32. In some embodiments, the vent conduit 220a may not be connected directly to the first air manifold 32b; for example, in some embodiments (not shown), the vent conduit 220a may connect to inlet conduit 32a. It will be appreciated that the plurality of product conduits 31, shown as connected to the nozzle arrays 26 in FIG. 5, are removed from FIG. 12 for clarity.

Additionally, as best viewed in FIG. 14, slide gates 35a, 35b and 35c may be provided for isolating a selected mini tank 220 from the first and second air supplies 32, 36 when the selected mini tank 220 is not in use. For example, slide gate 35a may be used to shut off the supply of air from the first air source 32 to the selected mini tank via the first air inlet 32a; slide gate 35b may be used to shut off the vent conduit 220a and thereby prevent air from the first air manifold 32b from entering the selected mini tank 220; and slide gate 35c may be used to prevent air from the second air supply 36 entering the selected mini tank via the second air manifold 36a and second air conduit 36b.

Cleanout System

Figure 3:
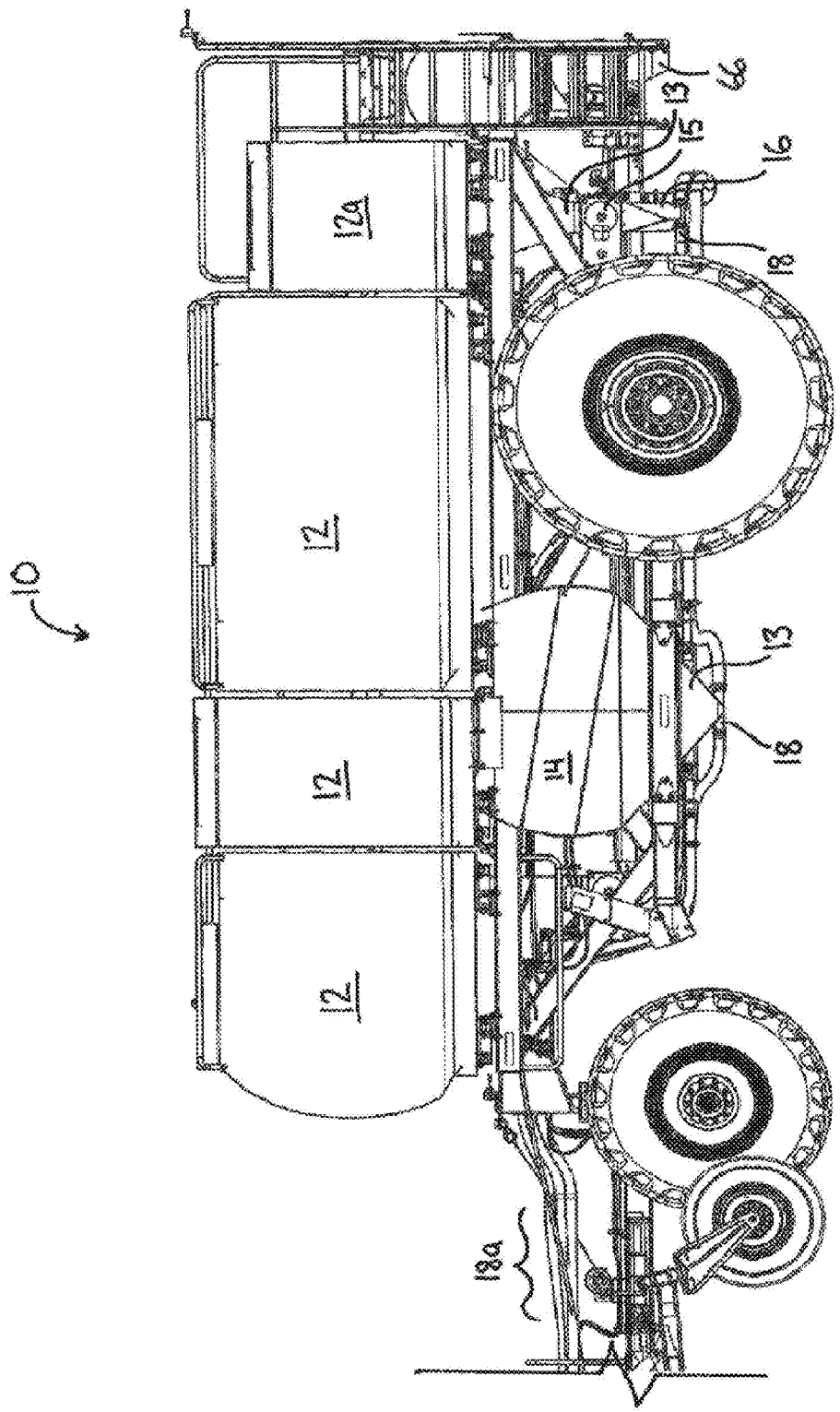
Figure 7:
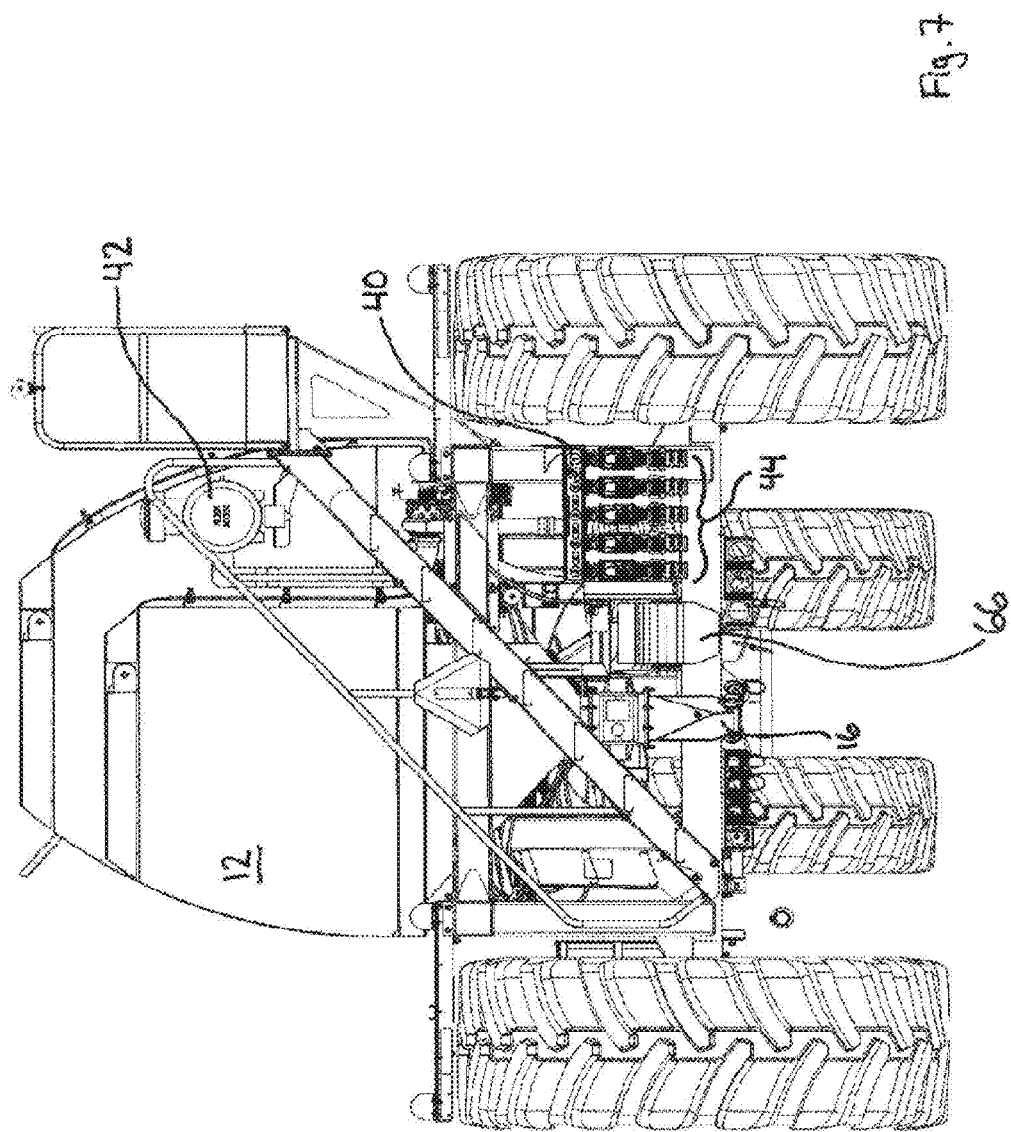
Figure 10:
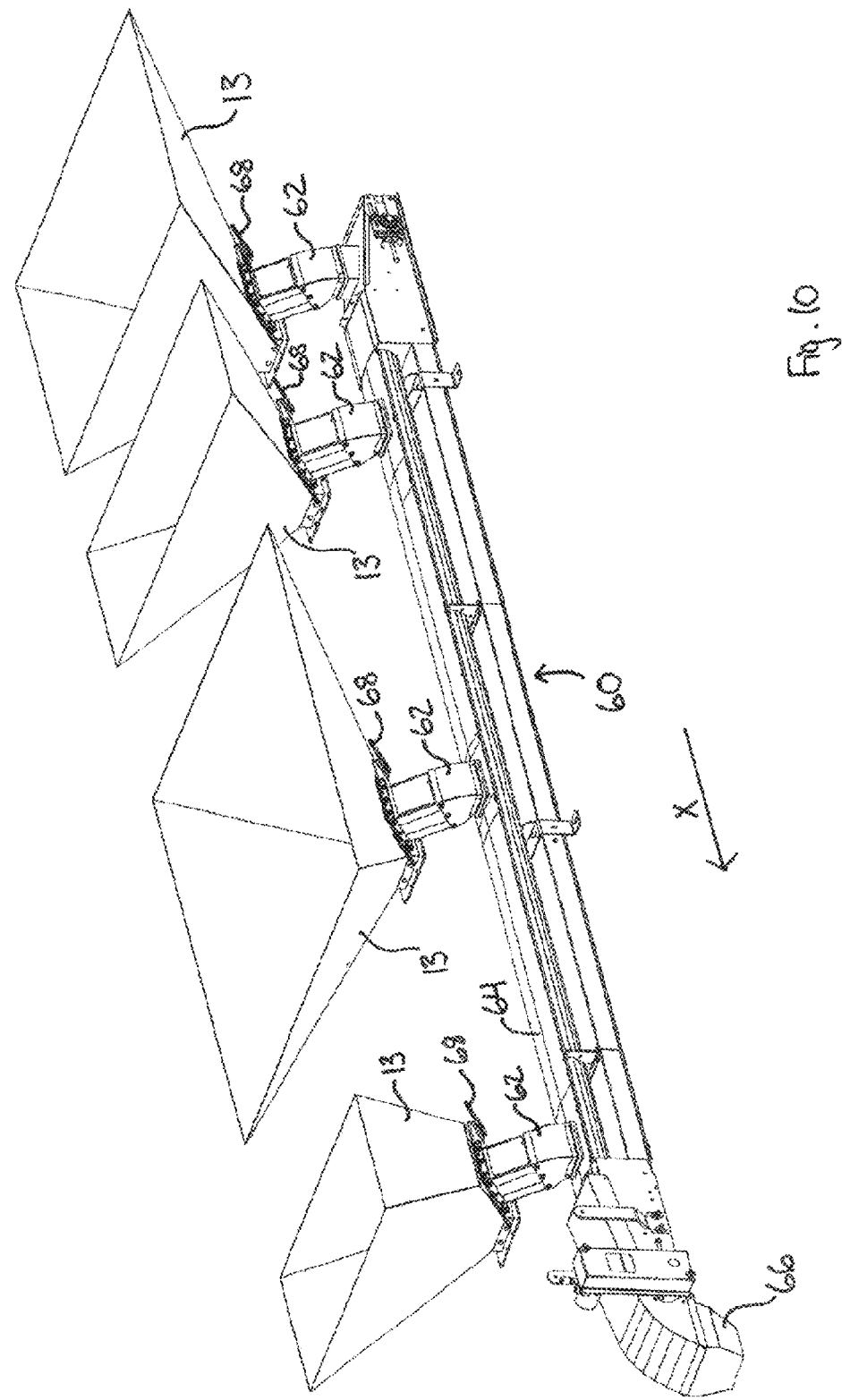

In another aspect of the present disclosure, the bulk transfer cart 10 may optionally be provided with a cleanout system 60. As may best be viewed in FIG. 10, the cleanout system conveniently enables cleaning out of each of the bulk product tanks 12 by providing a cleanout funnel 62, which funnel 62 feeds into a cleanout enclosure 64, the enclosure 64 containing a conveyancing mechanism as is known to a person skilled in the art for conveyancing agricultural product, including but not limited to a conveyor belt or an auger. The enclosure 64 includes an outlet 66 disposed at the rear of the bulk transfer cart, as may be seen for example in FIGS. 3 and 7. When it is desired to remove residual agricultural product from the bulk product tanks 12 of the bulk transfer cart 10, a shutter door 68 may be manually or automatically opened, allowing any product that remains in the hopper-shaped bottom 13 of a given product tank 12 to flow through the cleanout funnel 62 into the enclosure 64. From there, the product is conveyed within the enclosure 64 by the conveyancing mechanism in direction X towards the outlet 66, where the residual agricultural product is then easily accessed from the rearwardly-disposed outlet 66.

Optionally, it will be appreciated that the product tanks 12 may each be emptied one at a time, or else they may be emptied at once, for example when the leftover agricultural product is going to be disposed. It will also be appreciated that the shutter door may either be manually operated or electronically operated, for example through electromechanical devices or systems as are known in the art. Advantageously, the cleanout system 60 may be used to remove a significant mass of agricultural product from the bulk transfer cart when the cart 10 becomes stuck in the mud on a field, in order to pull the cart out of its position on the field. For example, when fully loaded, the cart 10 may be carrying up to 50,000 pounds of product, which must be removed from the cart in order to facilitate pulling the cart out of the mud. To applicant's knowledge, prior art air seeders include either an integrated or attachable, external swinging auger or conveyor system that is positioned underneath each tank of the air seeder so as to provide for cleaning out the air seeder tanks, one tank at a time. As such, each tank of the prior art seeders must be emptied out individually while being accessed from the side of the cart, and in some cases, mud may need to be dug out from underneath the cart in order to provide sufficient clearance underneath the tank for the removal of product from that tank.

Figure 2:
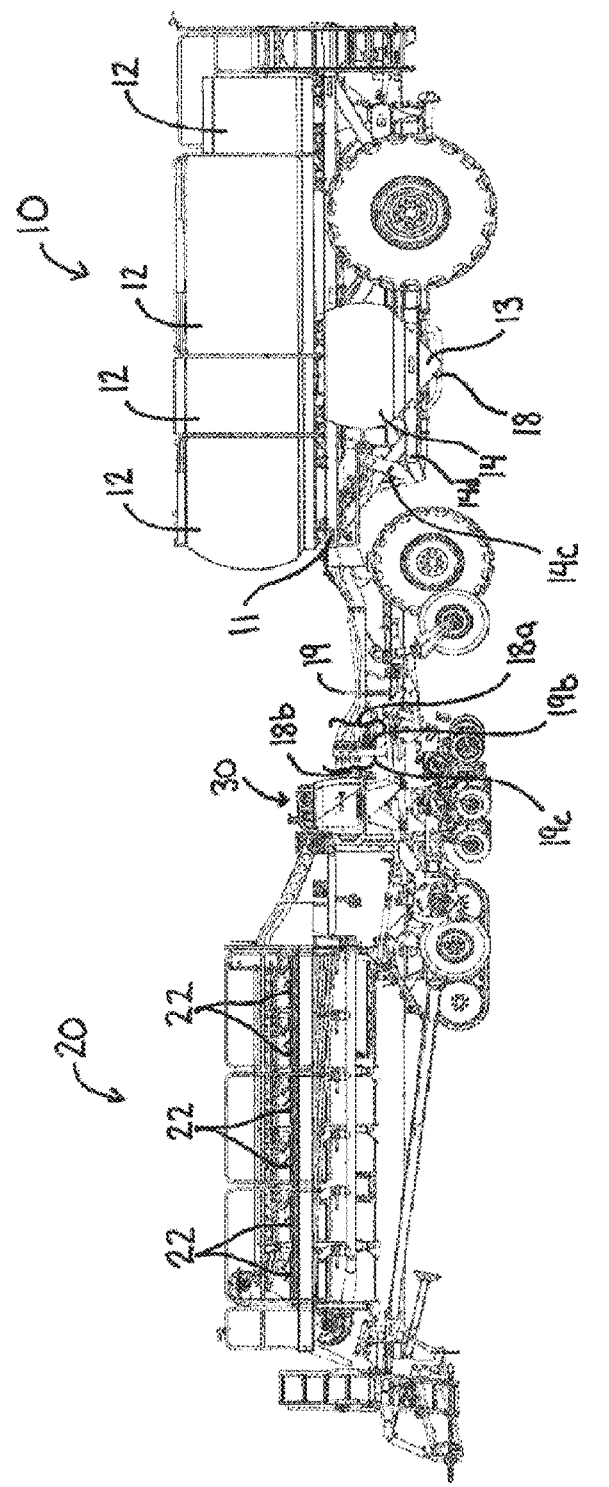
Figure 11:
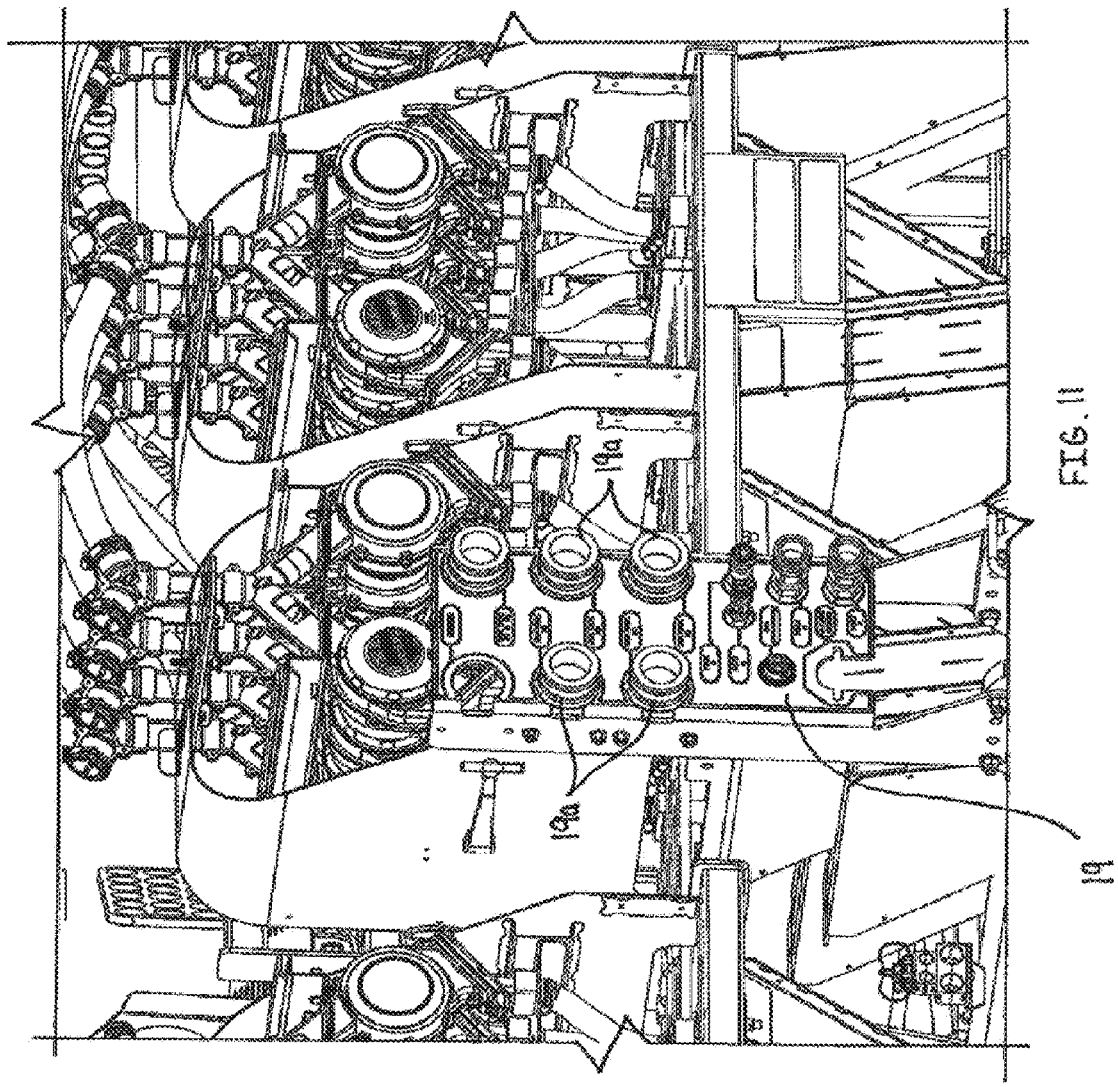

In another aspect of the present disclosure, the central frame 20 may include a routing manifold 19 for receiving and routing the plurality of product conduits 18 which carry the bulk product from the bulk product tanks 12 on the bulk transfer cart 10 to the plurality of mini tanks 22 on the central frame 20, as shown in FIGS. 2 and 11. As best seen in FIG. 11, the routing manifold 19 includes a plurality of ports 19a on the side 19b of the routing manifold that is adjacent the cart 10, the ports 19a each configured to receive a distal end of a first section 18a of product conduit 18. On the opposite side 19c of the manifold 19 that is adjacent the central frame 20, a second section of product conduit 18b is coupled, at a distal end of the second section 18b of conduit, to each of the ports 19a, and the other end of the second section 18b of product conduit 18 is coupled to the product inlet 22a of a mini tank. The routing manifold 19 provides the ability to readily configure which product tank 12 or 14 is connected to which mini tank 22, by merely selecting the port 19a on the routing manifold 19 that the first section 18a of each product conduit 18 is coupled to. This feature may be useful for embodiments of the present system that utilize metering assemblies having openers which place variably blended agricultural products into different locations and at different depths in the field during a planting or seeding operation, as each mini tank 22 may be configured to supply agricultural product to a particular location on each opener, and so the exact placement of different agricultural products via the opener may be configured by utilizing the routing manifold 19.

What is claimed is:

1. A product transfer system for providing a continuous supply of a plurality of agricultural products from a plurality of product tanks to an array of metering assemblies, the system comprising:
   a bulk transfer cart comprising a plurality of product tanks, wherein each product tank of the plurality of product tanks feeds into a corresponding product conduit that is selectively pressurized with air from a cart air source; and
   each product conduit is fluidly connected to a corresponding mini tank mounted on a central frame, the central frame coupled to an array of metering assemblies, each mini tank comprising a housing having a plurality of walls, a floor and a ceiling defining an interior cavity of the mini tank for receiving the agricultural product from a product inlet, each mini tank further comprising a level sensor, in communication with an electronic controller; and
   each mini tank further comprising a plurality of pickup nozzles extending into said interior cavity, each pickup nozzle of the plurality of pickup nozzles incorporating a Venturi assembly and coupled to a metering conduit to convey the agricultural product from the mini tank to at least one metering assembly of the array of metering assemblies, wherein each metering assembly includes a local product reservoir sandwiched between the corresponding metering conduit and a metering device, the local product reservoir having a screen open to an atmosphere surrounding the product transfer system; and
   each mini tank is in fluid communication with a first air source via a first air source manifold and a first air source conduit, wherein a first air stream generated by the first air source is pushed through a plurality of screened vents in the floor of the mini tank housing so as to entrain said agricultural product held within the interior cavity of the mini tank in the first air stream, the first air stream carrying said entrained agricultural product through the plurality of pickup nozzles and the corresponding metering conduits to a corresponding metering assembly; and a second air source is in fluid communication with a point of constriction of each said Venturi assembly, the second air source generating a second air stream pushed through a second air manifold, a second air source conduit and the point of constriction of each said Venturi assembly of each said pickup nozzle so as to join the first air stream and thereby accelerate the entrained agricultural product of the first air stream through the plurality of pickup nozzles and corresponding metering conduits; and wherein, when the level sensor detects the mini tank is nearly full, the controller generates a signal to shut off the cart air source supplied to the mini tank's corresponding product conduit so as to halt the conveying of agricultural product from the product tank to the corresponding mini tank; and wherein, when the level sensor detects the mini tank is nearly empty, the cart air source is supplied to the mini tank's corresponding product conduit to resume conveying the agricultural product from the product tank to the corresponding mini tank; and wherein agricultural product is continuously supplied from each mini tank to each metering assembly of the array of metering assemblies via the plurality of pickup nozzles and corresponding plurality of metering conduits by the first and second air streams.

2. The product transfer system of claim 1, wherein a pressure of the second air stream generated by the second air source is greater than a pressure of the first air stream generated by the first air source, creating a pressure differential so that a pressure of the said interior cavity of the mini tank is less than a pressure of the mini tank's corresponding metering conduit.

3. The product transfer system of claim 1, wherein the first air source manifold is positioned above the ceiling of each mini tank housing and is in fluid communication with an air chamber of each mini tank, wherein the air chamber of each mini tank is separated from the interior cavity of the mini tank by an interior wall, and wherein the first air stream is directed through the air chamber of the mini tank and a product air cavity beneath the floor of the mini tank housing, and wherein the first air stream flows through the product air cavity and enters the interior cavity of the mini tank through the said plurality of screened vents in the floor of the mini tank housing.

4. The product transfer system of claim 3, wherein the product air cavity includes a product air cavity housing beneath each mini tank, the product air cavity housing releasably attached to the mini tank with a latch, wherein the product air cavity housing may be selectively detached from the mini tank to enable removal of the agricultural product from the interior cavity of the mini tank so as to clean out the interior cavity of the mini tank.

5. The product transfer system of claim 3, wherein the ceiling of the mini tank housing includes a screened vent and a vent conduit, the vent conduit fluidly connecting the interior cavity of the mini tank to the first air source manifold, wherein excess pressure from the interior cavity of the mini tank is vented through the screened vent, the vent conduit and the first air source manifold.

6. The product transfer system of claim 5, wherein the interior wall separating the air chamber from the interior cavity of the mini tank includes a screened portion, and wherein a pressure of the interior cavity of the mini tank and a pressure of the air chamber are equalized by air flowing through the screened portion of the interior wall.

7. The product transfer system of claim 5, wherein the screened vent, the second air source manifold conduit and the first air source manifold conduit of each mini tank each include a slide gate, each slide gate having an open position and a closed position, wherein the slide gates of a selected mini tank are in the closed position when a selected mini tank is not in use so as to prevent the first and second air streams from entering the mini tank.

8. The product transfer system of claim 1, wherein the plurality of pickup nozzles of each mini tank includes first and second arrays of pickup nozzles, the first array of pickup nozzles disposed on a first side wall of the plurality of walls and the second array of pickup nozzles disposed on a second side wall of the plurality of walls, the first side wall disposed opposite the second side wall of the mini tank; and wherein the second air source conduit includes a first venturi conduit configured to supply air from the second air source to the first array of pickup nozzles and a second venturi conduit configured to supply air from the second air source to the second array of pickup nozzles.

9. The product transfer system of claim 1, further comprising an airlock sandwiched between a bottom of each product tank of the plurality of product tanks and a pressurized cart hopper, the pressurized cart hopper further comprising a hopper level sensor, wherein the airlock is temporarily deactivated by the controller to temporarily halt the transfer of the agricultural product from the product tank to the cart hopper when the hopper level sensor detects that the cart hopper is nearly full.

10. The product transfer system of claim 9, wherein a pitot tube assembly is in communication with said corresponding product conduit, downstream the cart air source and upstream the pressurized cart hopper so as to monitor an air velocity of the product conduit upstream of the pressurized cart hopper, the pitot tube assembly in communication with the electronic controller, wherein when the air velocity falls below a threshold indicating that product accumulated in the product conduit is blocking the product conduit, a signal is sent by the electronic controller to turn off the said air lock so as to temporarily halt the transfer of product from the said product tank to the pressurized cart hopper.

11. The system of claim 1, wherein there is a one to one ratio between each product tank, product conduit and mini tank.

12. The system of claim 11, wherein the central frame includes a routing manifold comprising a plurality of manifold inlets, each manifold inlet opening into an intermediate product conduit in fluid communication with a selected mini tank, wherein the selected mini tank may be connected to a selected product tank by connecting the product conduit of the selected product tank to the corresponding manifold inlet and intermediate conduit of the selected mini tank.

13. The product transfer system of claim 1 further comprising a cleanout system, the cleanout system comprising a conveyancing mechanism enclosed in a conveyancing housing, the conveyancing housing including a plurality of openings connected to corresponding cleanout funnels of each product tank, wherein each cleanout funnel includes a shutter door for selectively opening the product tank into the cleanout funnel so as to allow agricultural product within the mini tank to flow into the conveyancing housing and onto the conveyancing mechanism, the conveyancing mechanism operational to convey the agricultural product from each product tank to a cleanout outlet.

14. The product transfer system of claim 13, wherein the conveyancing mechanism is selected from a group comprising: a conveyor belt, an auger.

15. The product transfer system of claim 1, wherein volumetric capacity of each product tank is at least 40 times greater than the volumetric capacity of each mini tank.

16. The product transfer system of claim 15, wherein the volumetric capacity of each mini tank is equal to or less than one bushel.

17. The product transfer system of claim 1, wherein the level sensor of the mini tank is a proximity sensor.

18. The product transfer system of claim 17, wherein the level sensor includes an upper proximity sensor and a lower proximity sensor, wherein the lower proximity sensor is positioned at a lower elevation relative to an elevation of the upper sensor; and wherein, when the upper sensor detects the agricultural product, a shut off control signal is delivered to the controller of the system to close a valve of the mini tank's corresponding product conduit so as to shut off the corresponding product conduit from the cart air supply; and wherein, when the lower sensor detects an absence of the agricultural product, an open control signal is delivered to the controller of the system to open the valve so as to enable air from the cart air supply to flow into the corresponding product conduit.

19. The product transfer system of claim 1, wherein at least one product tank of the plurality of product tanks is pressurized by the cart air source.

20. The product transfer system of claim 19, wherein the at least one product tank is a side tank mounted laterally of the remaining product tanks of the plurality of product tanks, and wherein the side tank is mounted at a first height above a ground and the remaining product tanks are mounted at a second height above the ground, wherein the first height is less than the second height so as to facilitate manual loading of the side tank.

21. The product transfer system of claim 20, wherein a slide gate valve is slidably mounted to the product conduit corresponding to the pressurized side tank and a pitot tube assembly is in communication with said corresponding product conduit, downstream the cart air source and upstream the pressurized cart hopper so as to monitor an air velocity of the product conduit upstream of the pressurized cart hopper, the pitot tube assembly in communication with the electronic controller, wherein when the air velocity falls below a threshold indicating that product accumulated in the product conduit is blocking the product conduit, a signal is sent by the electronic controller to actuate the slide gate valve into a closed position so as to temporarily halt the transfer of product from the said side tank to the said corresponding product conduit.

22. The product transfer system of claim 20, wherein a volumetric capacity of the side tank is less than a volumetric capacity of any one of the remaining product tanks.

23. An intermediate mini tank of a bulk product transfer system for providing a continuous supply of a plurality of agricultural products from a plurality of product tanks to an array of metering assemblies, the intermediate mini tank being downstream of a product tank of the said plurality of product tanks and upstream of a local product reservoir that is adjacent a metering assembly of the said array of metering assemblies, the bulk product transfer system including a bulk transfer cart supporting the plurality of product tanks, the bulk transfer cart towed behind a central frame, the central frame coupled to the array of metering assemblies, wherein each product tank of the plurality of product tanks feeds into a corresponding product conduit that is selectively pressurized with air from a cart air source, each metering assembly of the array of metering assemblies including said local product reservoir sandwiched between a corresponding metering conduit and a metering device, the local product reservoir having a screen open to the atmosphere surrounding the product transfer system, the bulk transfer system further comprising a first air source in fluid communication with a first air source manifold and a first air source conduit and a second air source manifold and a second air source conduit, wherein the intermediate mini tank comprises:

a housing having a plurality of walls, a floor and a ceiling defining an interior cavity of the mini tank for receiving the agricultural product from a product inlet, each mini tank further comprising a level sensor, in communication with an electronic controller; and a plurality of pickup nozzles extending into said interior cavity, each pickup nozzle of the plurality of pickup nozzles incorporating a Venturi assembly and coupled to the said corresponding metering conduit to convey the agricultural product from the mini tank to at least one metering assembly of the said array of metering assemblies; and wherein each mini tank is in fluid communication with the said first air source via the first air source manifold and the first air source conduit, wherein a first air stream generated by the first air source is pushed through a plurality of screened vents in the floor of the mini tank housing so as to entrain said agricultural product held within the interior cavity of the mini tank in the first air stream, the first air stream carrying said entrained agricultural product through the plurality of pickup nozzles and the corresponding metering conduits to a corresponding metering assembly of the said array of metering assemblies; and the said second air source is in fluid communication with a point of constriction of each said Venturi assembly, the second air source generating a second air stream pushed through the said second air manifold, said second air source conduit and the point of constriction of each said Venturi assembly of each said pickup nozzle so as to join the first air stream and thereby accelerate the entrained agricultural product of the first air stream through the plurality of pickup nozzles and corresponding metering conduits; and wherein, when the level sensor detects the mini tank is nearly full, the controller generates a signal to shut off the cart air source supplied to the mini tank's corresponding product conduit so as to halt the conveying of agricultural product from the product tank to the corresponding mini tank; and wherein, when the level sensor detects the mini tank is nearly empty, the cart air source is supplied to the mini tank's corresponding product conduit to resume conveying the agricultural product from the product tank to the corresponding mini tank; and wherein agricultural product is continuously supplied from each mini tank to each metering assembly of the array of metering assemblies via the plurality of pickup nozzles and corresponding plurality of metering conduits by the first and second air streams; and wherein a pressure of the said interior cavity of the mini tank is less than a pressure of the said corresponding metering conduit of the mini tank when the mini tank is installed on a bulk product transfer system in operation.

24. The mini tank of claim 23, wherein the first air source manifold is positioned above the ceiling of each mini tank housing and is in fluid communication with an air chamber of each mini tank, wherein the air chamber of each mini tank is separated from the interior cavity of the mini tank by an interior wall, and wherein the first air stream is directed through the air chamber of the mini tank and a product air cavity beneath the floor of the mini tank housing, and wherein the first air stream flows through the product air cavity and enters the interior cavity of the mini tank through the said plurality of screened vents in the floor of the mini tank housing.

25. The mini tank of claim 24, wherein the product air cavity includes a product air cavity housing beneath each mini tank, the product air cavity housing releasably attached to the mini tank with a latch, wherein the product air cavity housing may be selectively detached from the mini tank to enable removal of the agricultural product from the interior cavity of the mini tank so as to clean out the interior cavity of the mini tank.

26. The mini tank of claim 24, wherein the ceiling of the mini tank housing includes a screened vent and a vent conduit, the vent conduit fluidly connecting the interior cavity of the mini tank to the first air source manifold, wherein excess pressure from the interior cavity of the mini tank is vented through the screened vent, the vent conduit and the first air source manifold.

27. The mini tank of claim 26, wherein the interior wall separating the air chamber from the interior cavity of the mini tank includes a screened portion, and wherein a pressure of the interior cavity of the mini tank and a pressure of the air chamber are equalized by air flowing through the screened portion of the interior wall.

28. The mini tank of claim 26, wherein the screened vent, the second air source manifold conduit and the first air source manifold conduit of each mini tank each include a slide gate, each slide gate having an open position and a closed position, wherein the slide gates of a selected mini tank are in the closed position when a selected mini tank is not in use so as to prevent the first and second air streams from entering the mini tank.

29. The mini tank of claim 23, wherein the plurality of pickup nozzles of each mini tank includes first and second arrays of pickup nozzles, the first array of pickup nozzles disposed on a first side wall of the plurality of walls and the second array of pickup nozzles disposed on a second side wall of the plurality of walls, the first side wall disposed opposite the second side wall of the mini tank; and wherein the second air source conduit includes a first venturi conduit configured to supply air from the second air source to the first array of pickup nozzles and a second venturi conduit configured to supply air from the second air source to the second array of pickup nozzles.

30. The mini tank of claim 23, wherein volumetric capacity of each product tank is at least 40 times greater than the volumetric capacity of each mini tank.

* * * * *